(12) United States Patent
Nonaka et al.

(10) Patent No.: US 8,484,485 B2
(45) Date of Patent: Jul. 9, 2013

(54) ENCRYPTION DEVICE AND ENCRYPTION SYSTEM

(75) Inventors: Masao Nonaka, Osaka (JP); Yuichi Futa, Osaka (JP); Kaoru Yokota, Osaka (JP); Natsume Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 348 days.

(21) Appl. No.: 12/936,740

(22) PCT Filed: May 14, 2009

(86) PCT No.: PCT/JP2009/002114
§ 371 (c)(1),
(2), (4) Date: Oct. 7, 2010

(87) PCT Pub. No.: WO2009/147788
PCT Pub. Date: Dec. 10, 2009

(65) Prior Publication Data
US 2011/0033046 A1    Feb. 10, 2011

(30) Foreign Application Priority Data
Jun. 4, 2008 (JP) ................. 2008-146895

(51) Int. Cl.
*G06F 11/30* (2006.01)
*G06F 12/14* (2006.01)
*H04K 1/00* (2006.01)
*H04L 9/00* (2006.01)
*H04L 9/28* (2006.01)

(52) U.S. Cl.
USPC ................. 713/189; 380/28; 380/29; 380/30; 713/193

(58) Field of Classification Search
USPC ................. 713/189, 193, 194, 150, 151, 190; 380/28–30, 44, 45, 277
See application file for complete search history.

(56) References Cited

U.S. PATENT DOCUMENTS
5,838,791 A    11/1998 Torii et al.
6,081,597 A    6/2000 Hoffstein et al.
(Continued)

FOREIGN PATENT DOCUMENTS
EP    0 625 845    11/1994
JP    6-326881    11/1994
(Continued)

OTHER PUBLICATIONS
International Search Report issued Jun. 16, 2009 in International (PCT) Application No. PCT/JP2009/002114.

*Primary Examiner* — Tae Kim
(74) *Attorney, Agent, or Firm* — Wenderoth, Lind & Ponack, L.L.P.

(57) ABSTRACT

An encryption apparatus prevents plaintext data from leaking even if accumulated data is analyzed, while preventing the size of encrypted data from increasing. The encryption apparatus encrypts a data piece that is smaller than a unit length and stores management information indicating a used area within an encryption area defined based on the unit length. The used area is an area already used for encryption. When encrypting a new data piece that is smaller than the unit length, the encryption apparatus generates encrypted data by adding the new data piece to an unused area within the encryption area with reference to the management information. The unused area is an area not yet used for encryption. The encryption apparatus updates the management information to include an area for the new data piece into the used area, after generating the encrypted data.

22 Claims, 16 Drawing Sheets

U.S. PATENT DOCUMENTS

| | | |
|---|---|---|
| 6,298,137 B1 | 10/2001 | Hoffstein et al. |
| 6,459,792 B2 | 10/2002 | Ohmori et al. |
| 6,501,840 B1 | 12/2002 | Saijo |
| 7,200,242 B2 | 4/2007 | Murakami |
| 7,463,736 B2* | 12/2008 | Tagashira et al. ............. 380/216 |
| 7,529,366 B2* | 5/2009 | Ichinose et al. ............... 713/189 |
| 7,546,469 B2 | 6/2009 | Suzuki et al. |
| 8,352,726 B2* | 1/2013 | Bojinov et al. ............... 713/151 |
| 2002/0015492 A1 | 2/2002 | Ohmori et al. |
| 2002/0116612 A1* | 8/2002 | Yamamichi et al. .......... 713/168 |
| 2003/0065925 A1* | 4/2003 | Shindo et al. ................. 713/178 |
| 2004/0028256 A1 | 2/2004 | Murakami |
| 2004/0215955 A1* | 10/2004 | Tamai et al. ................... 713/150 |
| 2005/0031123 A1* | 2/2005 | Ichinose et al. ................. 380/37 |
| 2005/0102498 A1* | 5/2005 | Bojinov et al. ............... 713/151 |
| 2005/0108559 A1 | 5/2005 | Suzuki et al. |
| 2006/0171531 A1* | 8/2006 | Teranisi ........................... 380/28 |
| 2007/0106907 A1* | 5/2007 | Rainsard et al. .............. 713/189 |
| 2008/0192924 A1* | 8/2008 | Shang ............................. 380/28 |
| 2009/0327751 A1* | 12/2009 | Koifman et al. .............. 713/189 |

FOREIGN PATENT DOCUMENTS

| | | |
|---|---|---|
| JP | 8-56356 | 1/1996 |
| JP | 11-7239 | 1/1999 |
| JP | 11-225138 | 8/1999 |
| JP | 2000-516733 | 12/2000 |
| JP | 2004-40237 | 2/2004 |
| JP | 2005-149416 | 6/2005 |
| WO | 98/08323 | 2/1998 |

* cited by examiner

| Ciphertext identifier CTID | Total size TSIZE | Converted-data size USIZE | Transmission flag UFLAG |
|---|---|---|---|
| 1 | 167 | 160 | FALSE |
| 2 | 167 | 160 | TRUE |
| 3 | 167 | 40 | TRUE |
| ... | | | |

112

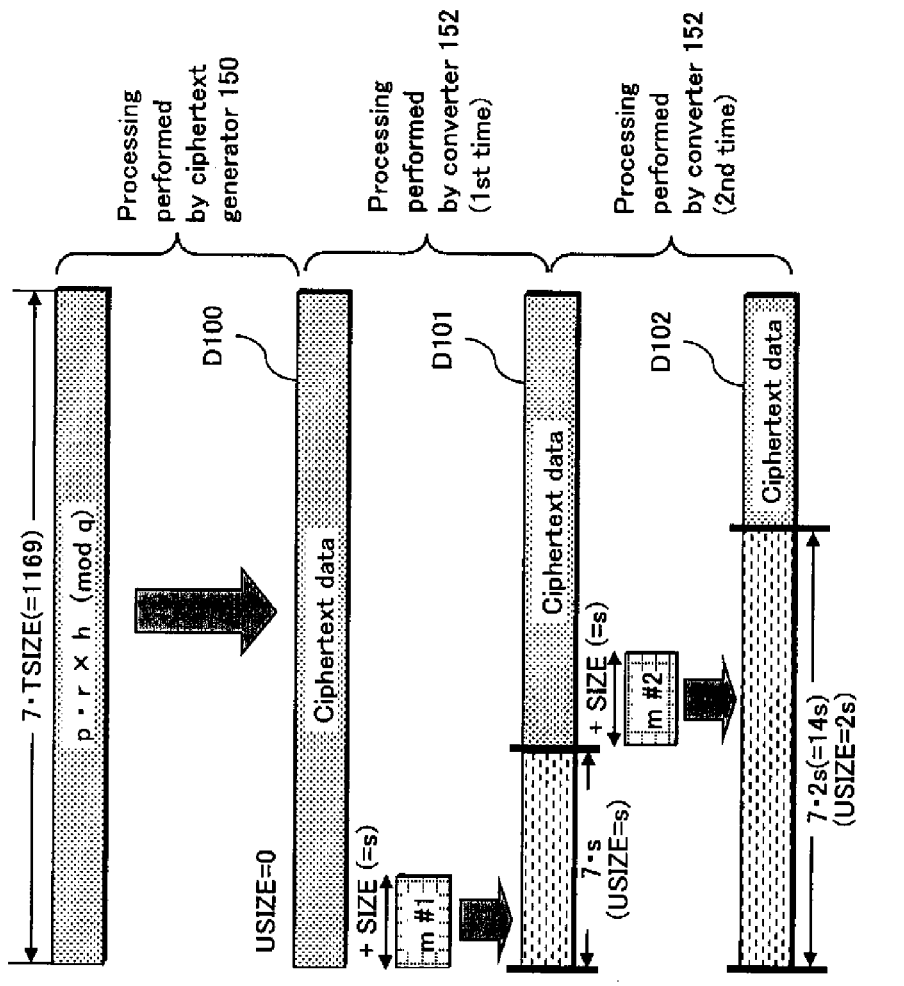
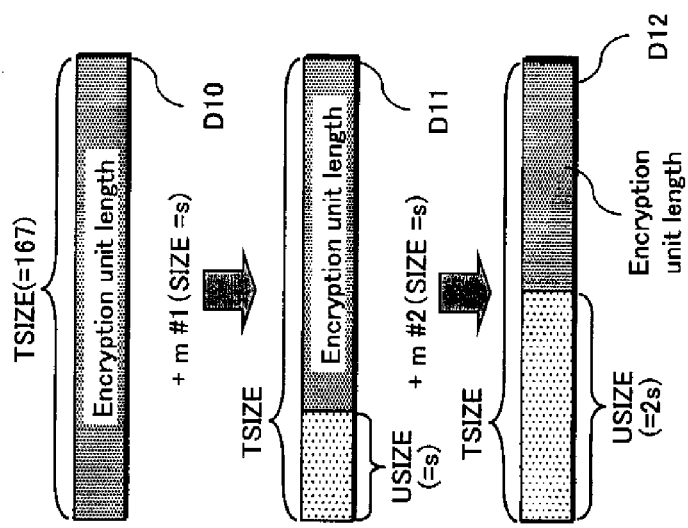

FIG. 6A

Generate ciphertext data D100
$CTDATA = p \cdot r \times h \pmod{q}$
$= e\_1 + e\_2 \times X + \cdots + e\_s \times X^{(s-1)}$
$+ e\_(s+1) \times X^{(s)} + e\_(s+2) \times X^{(s+1)} + \cdots + e\_(2s) \times X^{(2s)}$
$+ \cdots + e\_N \times X^{(N-1)}$

FIG. 6B

Encrypt m#1 to generate ciphertext data D101
$m\#1 = m\_1 + m\_2 \times X + \cdots + m\_s \times X^{(s-1)}$
$CTDATA \leftarrow CTDATA + m\#1 \times X^{(USIZE)}$
$= CTDATA + m\#1 \times X^{0}$
$= (e\_1 + m\_1) + (e\_2 + m\_2) \times X + \cdots + (e\_s + m\_s) \times X^{(s-1)} +$
$e\_(s+1) \times X^{(s)} + e\_(s+2) \times X^{(s+1)} + \cdots + e\_N \times X^{(N-1)}$

FIG. 6C

Encrypt m#2 to generate ciphertext data D102
$m\#2 = m'\_1 + m'\_2 \times X + \cdots + m'\_s \times X^{(s-1)}$
$CTDATA \leftarrow CTDATA + m\#2 \times X^{(USIZE)}$
$= CTDATA + m\#2 \times X^{(s)}$
$= (e\_1 + m\_1) + (e\_2 + m\_2) \times X + \cdots + (e\_s + m\_s) \times X^{(s-1)} +$
$(e\_(s+1) + m'\_1) \times X^{(s)} + (e\_(s+2) + m'\_2) \times X^{(s+1)} + \cdots$
$+ (e\_2s + m'\_s) \times X^{(2s-1)} +$
$\cdots + e\_N \times X^{(N-1)}$

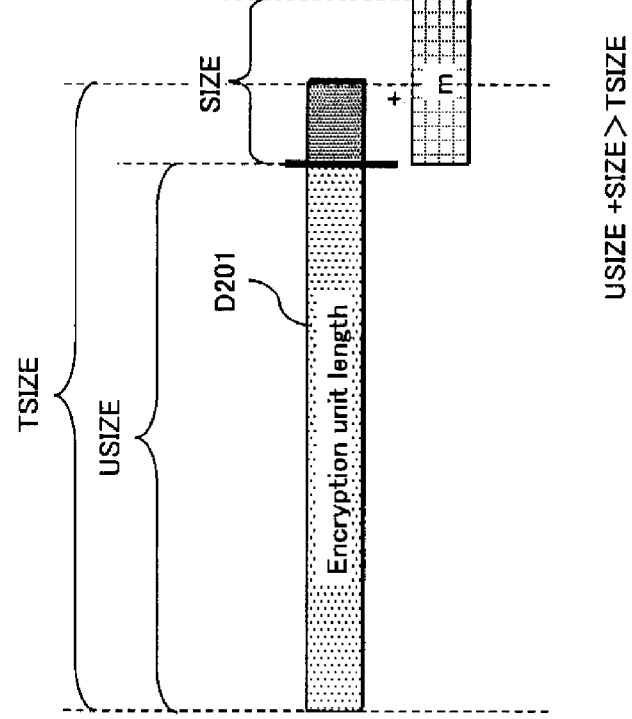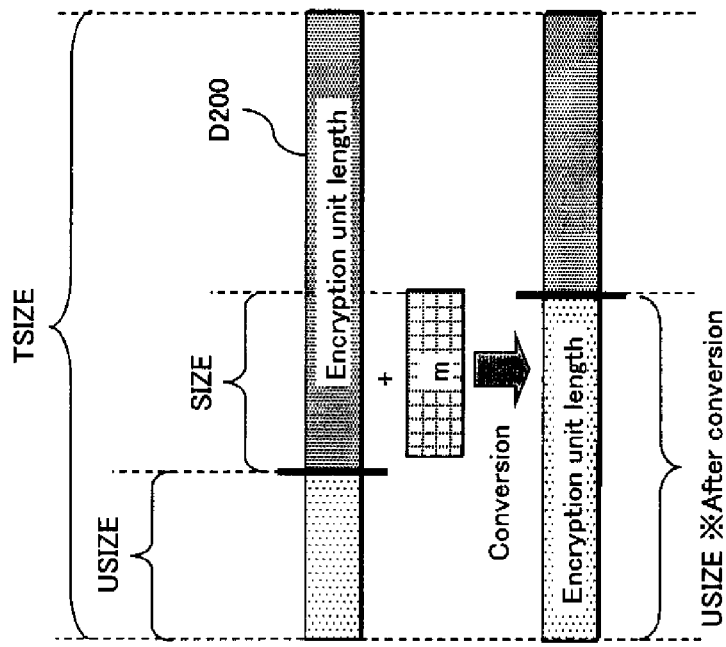
FIG. 9A
FIG. 9B

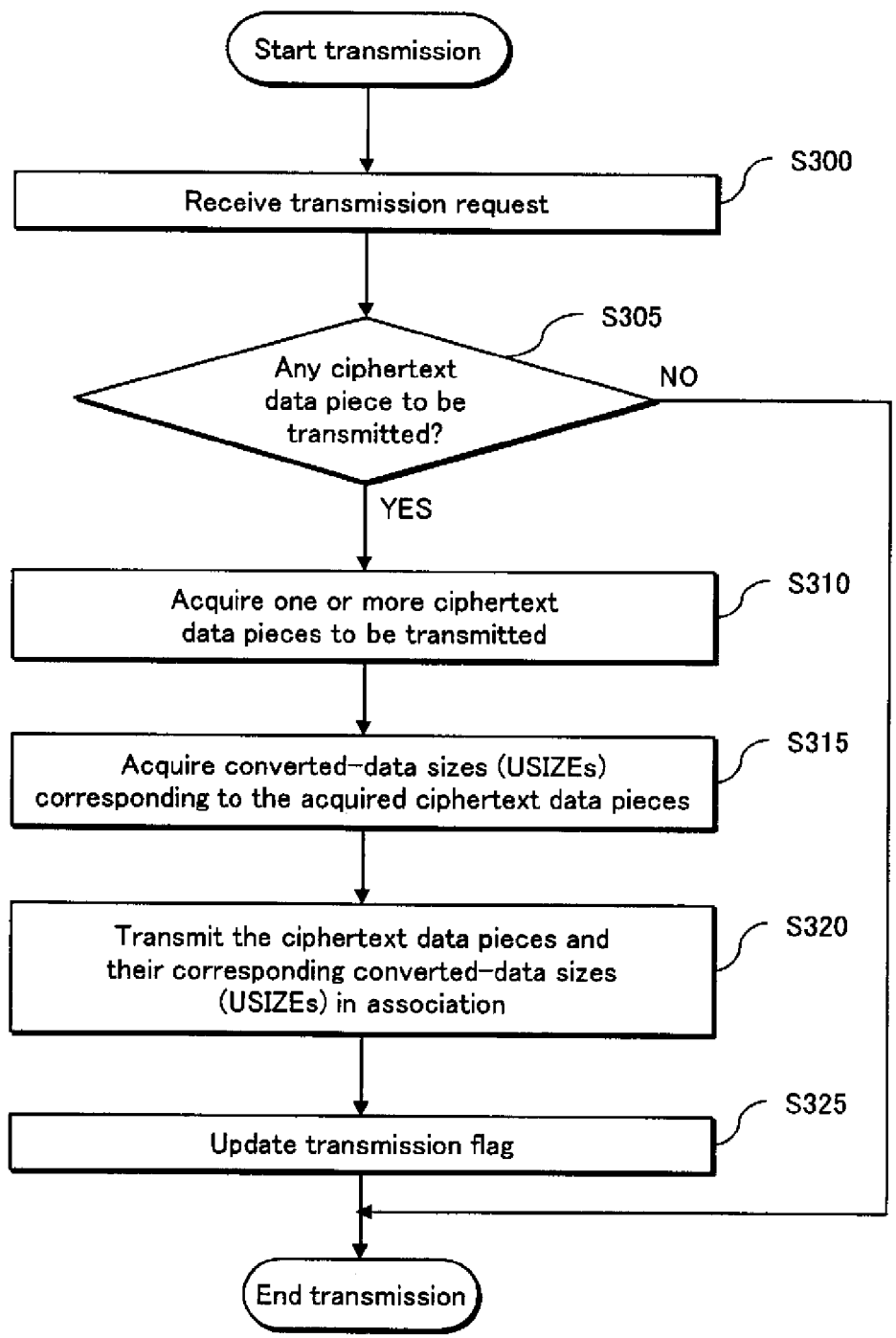

ENCRYPTION DEVICE AND ENCRYPTION SYSTEM

BACKGROUND OF INVENTION

1. Technical Field

The present invention relates to technologies for encrypting and accumulating data pieces having a size smaller than a unit size for encryption.

2. Background Art

In recent years, tags having various sensor functions as well as a communication function have been developed, and various kinds of application software using such tags have been designed accordingly. The sensor functions include, for example, the function of a temperature sensor. As a possible application, a tag having a temperature sensor may be attached to an object such as a perishable product and an art work to measure the temperature of the object during the transportation thereof. Another possible application is to use such a tag to provide a healthcare system for patients who require regular or long-term measurement of their body temperatures. In this way, a tag having such a measurement function (hereinafter called "a sensor tag") attached to an object such as a product being transported and a patient's body is capable of obtaining the state of the object regularly. The state data obtained through the measurement is accumulated temporarily in the sensor tag. After the measurement for a given period, the sensor tag is removed from the product or the patient's body, and the accumulated state data is read out by using the communication function. Microminiaturized tags are capable of conducting regular measurement without making transporters or patients conscious of the presence of the sensor tags.

In the case of using sensor tags to provide a healthcare system for patients, it is necessary to guarantee the security of the data accumulated in each sensor tag. This is because the biological data obtained through the measurement is privacy for each patient. Thus, the biological data should be prevented from leaking, in case a sensor tag attached to the patient's body falls off without being noticed by the patient and is picked up by a third party, or the sensor tag falls into the hands of a third party because of careless handling of the tag after the biological data has been read out from it. In view of such risks, in order to prevent the biological data obtained through the measurement from leaking, it is necessary to provide a mechanism for encrypting the data within the sensor tag and accumulating it in encrypted form.

There are two major methods for encryption. One is a method with use of secret key cryptography, and the other is a method with use of public key cryptography. Secret key cryptography is characterized by that it uses an encryption key and a decryption key which are identical. Public key cryptography is characterized by that it uses an encryption key (i.e. public key) and a decryption key (i.e. private key) which are different. In both cases, only the encryption key is to be stored in the sensor tag. Here, suppose the case where the sensor tag is analyzed and the data inside leaks. In this case, it means that the encryption key can be analyzed.

In the case of secret key cryptography, the encrypted data in the sensor tag can be easily decrypted by using the encryption key, because the encryption key is identical to the secret key. Hence, it can not guarantee a high security level.

In the case of public key cryptography on the other hand, it is almost impossible to derive the decryption key from the encryption key, even though the encryption key is obtained. Hence, it is impossible to decrypt the encrypted data in the sensor tag. In this way, public key cryptography used for encryption of the accumulate data achieves a high security level. There are various kinds of public key cryptography, including RSA (Rivest Shamir Adleman) encryption, ElGamal encryption, elliptic curve ElGamal encryption, and NTRU encryption.

CITATION LIST

Patent Literature

[Patent Literature 1]
Japanese Patent Application Publication No. 2000-516733

SUMMARY OF INVENTION

In the case of using public key cryptography, it is characteristic that the sizes of biological data pieces to be encrypted are smaller than the unit size for encryption by the public key cryptography. It is also characteristic that the biological data pieces are acquired consecutively.

In view of the aspects above, there are two major methods for realizing the encryption.

One is to add fixed values (i.e., paddings) to each small piece of biological data. The other is to temporarily accumulate small biological data pieces that have not been encrypted, and concatenate and encrypt them only when the total size of the accumulated data pieces reaches a predetermined size.

A problem of the first method is that the ciphertext would have a large size. For specific explanation, suppose the cases of 1024-bit RSA cryptography and NTRU encryption with the degree of 167, where each biological data piece is 24-bit. In the case of 1024-bit RSA cryptography, the unit size for encryption is 1024 bits. Thus, fixed values (i.e. paddings) amounting to 1000 bits are concatenated with a 24-bit biological data piece, and the encryption is performed on the data after the concatenation. As a result, a ciphertext corresponding to a 1024-bit plaintext is obtained. However, only 24 bits in the ciphertext have significance. On the other hand, in the case of the NTRU encryption with the degree of 167, the unit size for encryption is 167 bits. Thus, fixed values (i.e. paddings) amounting to 143 bits are concatenated with a 24-bit biological data piece, and the encryption is performed on the data after the concatenation. As a result, a ciphertext corresponding to a 167-bit plaintext is obtained. However, only 24 bits in the ciphertext have significance. In both cases, the size of the encrypted data is increased for the fixed values (i.e. paddings), which leads to inefficiency.

A problem of the second method is that the data pieces are temporarily accumulated in unencrypted form. If the sensor tag is subjected to internally analysis, there is a risk that the data leaks as it is. This is problematic in view of the security.

In view of the above problems, the present invention aims to provide an encryption apparatus, an encryption system, an encryption method a computer program and an integrated circuit that are capable of preventing the plaintext data from leaking even if the accumulated data is analyzed, while suppressing the increase of the size of the encrypted data as much as possible.

In order to solve the above problems, one aspect of the present invention is an encryption apparatus for encrypting a data piece that is smaller than a unit length for encryption, comprising: a storage unit operable to store therein management information indicating a used area within an encryption area defined based on the unit length, the used area being an area already used for encryption; an encryption unit operable, when encrypting a new data piece that is smaller than the unit length, to generate encrypted data by adding the new data piece to an unused area within the encryption area with reference to the management information, the unused area being an area not used for encryption; and a control unit operable to update the management information to include an area for encryption of the new data piece into the used area, after the encryption unit generates the encrypted data.

With the stated structure, the encryption apparatus generates the encrypted data by adding the new data piece, which is to be encrypted, to the unused area. Thus, it is unnecessary for the encryption apparatus to generate encrypted data having the unit length every time it encrypts a data piece that is smaller than the unit length. Therefore, the apparatus is capable of greatly reducing the data size to be used for the encryption in total. Accordingly, the apparatus is capable of suppressing the increase of the data size of the encrypted data as much as possible. Moreover, the apparatus is capable of preventing plaintext data from leaking even when the accumulated data is analyzed, because the accumulated data is encrypted.

BRIEF DESCRIPTION OF DRAWINGS

FIG. 3 shows an example data structure of a convertibility information table T100.

FIG. 5A shows changes of converted-data size USIZE, and FIG. 5B shows changes of ciphertext data.

FIG. 6 shows a specific example of calculations performed by a ciphertext generator 150 and a converter 152.

FIG. 9 shows a specific example of operations for judgment performed at Step S105 in the measurement.

FIG. 10 is a flowchart showing operations for transmission performed by the data encryption apparatus 11.

FIG. 15 is a block diagram showing the structure of a data encryption system 1a.

DETAILED DESCRIPTION OF INVENTION

Figure 1:
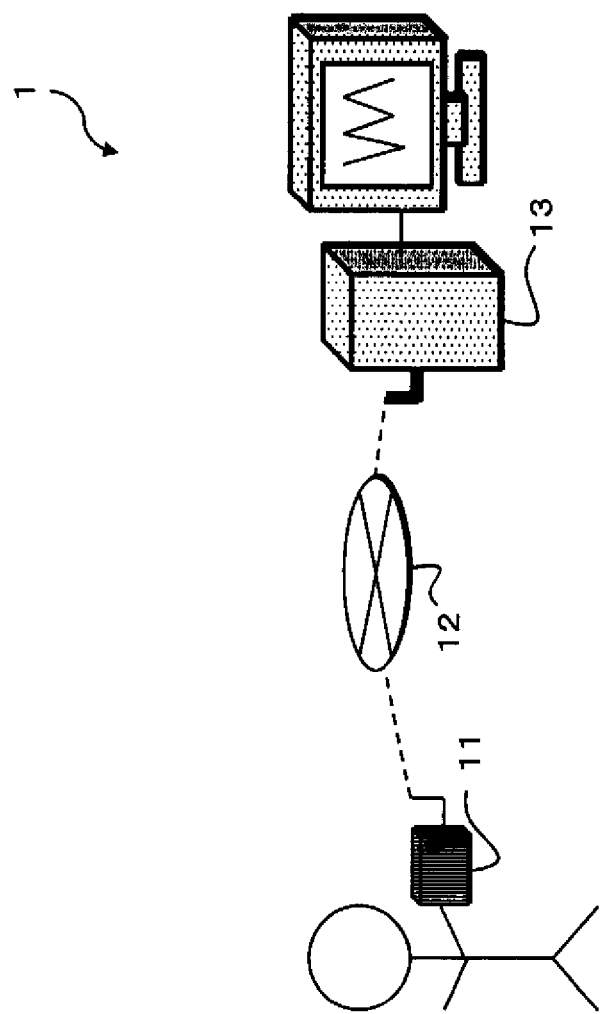
FIG. 1 is a block diagram showing a structure of a data encryption system 1 pertaining to an embodiment of the present invention.

One aspect of the present invention is an encryption apparatus for encrypting a data piece that is smaller than a unit length for encryption, comprising:
a storage unit operable to store therein management information indicating a used area within an encryption area defined based on the unit length, the used area being an area already used for encryption; an encryption unit operable, when encrypting a new data piece that is smaller than the unit length, to generate encrypted data by adding the new data piece to an unused area within the encryption area with reference to the management information, the unused area being an area not used for encryption; and a control unit operable to update the management information to include an area for encryption of the new data piece into the used area, after the encryption unit generates the encrypted data.

With the stated structure, the encryption apparatus generates the encrypted data by adding the new data piece to be encrypted to the unused area. Thus, it is unnecessary for the encryption apparatus to generate encrypted data having the unit length every time it encrypts a data piece that is smaller than the unit length. Therefore, the encryption apparatus is capable of greatly reducing the data size to be used for the encryption in total. Accordingly, the encryption apparatus is capable of suppressing the increase of the data size of the encrypted data as much as possible. Moreover, the encryption apparatus is capable of preventing plaintext data from leaking even when the accumulated data is analyzed, because the accumulated data is encrypted.

The encryption unit may add the new data piece to the unused area only when the area for encryption of the new data piece is contained within the unused area.

With the stated structure, the new data piece is added to the unused area when an area to be used for the encryption of the new data piece is contained within the unused area. Thus, the new data piece is surely encrypted within the encryption area containing data already encrypted.

When the area for encryption of the new data piece is larger than the unused area, the encryption unit may generate, in a new encryption area, second encrypted data beginning with the new data piece, and after the encryption unit generates the second encrypted data, the control unit may generate, based on the second encrypted data, second management information indicating the area for encryption of the new data piece as a used area within the new encryption area, and store the second management information in the storage unit.

With the stated structure, even when the encryption area containing data already encrypted is not available, the encryption apparatus generates the second encrypted data. Thus, the encryption apparatus is capable of preventing the new data piece from leaking.

Each of the first management information and the second management information may further include a data length of the corresponding used area.

The unit length may be represented as a data length of plaintext data available for encryption, a data length of the used area may be a data length of part of the plaintext data used for encryption, and the encryption unit may determine that the area for encryption of the new data piece is contained within the unused area when a value obtained by subtracting the data length of the used area from the unit length is greater than a data length of the new data piece.

The encryption unit may determine that the area for encryption of the new data piece is larger than the unused area when the value obtained by subtracting the data length of the used area from the unit length is less than the data length of the new data piece.

With the stated structure, the encryption apparatus can easily determine whether it is possible to perform the encryption with use of the encryption area containing data already encrypted, by using the information of the unit length for encryption and the used area.

The encryption unit may include a holding unit holding a public key for public key cryptography and a generator generating a random number, generate a one-time encryption key based on the unit length by using the public key and the random number, and add the new data piece by using, as the encryption area, a data area containing the one-time encryption key.

With the stated structure, the encryption apparatus generates, by using the public key, the one-time encryption key that is different from the public key, and generates the encrypted data by using the one-time encryption key. Thus, the encryption apparatus is capable of more surely preventing the data leakage.

The encryption unit may cause the generator to generate a different random number for each data piece having the unit length, and generate a different one-time encryption key for each data piece having the unit length.

With the stated structure, the encryption apparatus updates the one-time encryption key for each data piece having the unit length. Thus, even if some data pieces are analyzed because of leakage of the one-time encryption key, the other data pieces are prevented from leaking Hence the encryption apparatus is capable of more surely preventing the leakage of the data as a whole.

When the encryption unit encrypts the new data piece for the first time by using an encryption area defined based on the unit length and a data size of the used area is smaller than a predetermined minimum size, the encryption unit may generate the encrypted data by adding an initial data thereto so that the data size of the used area exceeds the predetermined minimum size.

When the encryption apparatus encrypts the new data piece for the first time by using an encryption area defined based on the unit length and the data size of the used area is smaller than a predetermined minimum size, if encrypted data only containing the encrypted new data piece is output from the apparatus, the data can be analyzed because of its small size.

In view of this, the encryption apparatus having the stated structure generates the encrypted data by adding the initial data thereto so that the data size of the used area exceeds the predetermined minimum size. Thus, even if the encrypted data only containing the encrypted new data piece is output from the apparatus, the minimum size of the encrypted data is guaranteed. Therefore, the encryption apparatus is capable of reducing the risk of the leakage of the data when the data is analyzed.

The initial data may be a sequence of numbers generated from random numbers.

With the stated structure, the encryption apparatus includes the random number as the initial data into the encrypted data. Thus, the apparatus makes it difficult to specify the part used for the data to be encrypted.

The encryption apparatus may further comprise: a connector operable to connect to an external apparatus, wherein the external apparatus includes: a holding unit holding a public key for public key cryptography; a random number generator generating a random number; and a key generator generating a one-time encryption key by using the public key and the random number, and the encryption unit may receive the one-time encryption key from the external apparatus, and generate the encrypted data by using, as the encryption area, a data area containing the one-time encryption key.

With the stated structure, the encryption apparatus does not require a component for generation of the one-time encryption key. Thus, the encryption apparatus is capable of reducing the manufacturing cost while ensuring the acquisition of the public key.

The encryption apparatus may further comprise: a second storage unit, wherein the encryption unit may include a holding unit holding a public key for public key cryptography and a generator generating a random number, generate a one-time encryption key based on the unit length by using the public key and the random number, store the one-time encryption key into the second storage unit, and read, from the second storage unit, a different one-time encryption key for each data piece having the unit length, and adds the new data piece by using, as the encryption area, a data area containing the one-time encryption key.

With the stated structure, the encryption apparatus stores therein the one-time encryption key. Thus, it requires a shorter processing time relating to the encryption than in the case of generating the public key when performing the encryption.

The encryption apparatus may further comprise: a connector operable to connect to an external apparatus holding a public key for public key cryptography, wherein the encryption unit may include a random number generator generating a random number, and generate a one-time encryption key based on the unit length by using the public key input from the external apparatus and the random number, and add the new data piece by using, as the encryption area, a data area containing the one-time encryption key.

With the stated structure, it is unnecessary for the encryption apparatus to store the public key when it is manufactured. In other words, the key can be determined after the shipping of the apparatus. This improves the convenience.

The encryption apparatus may further comprise: a connector operable to connect to an external apparatus for decrypting the encrypted data, wherein when the new data piece is to be the first data piece of the encrypted data and a data size of the used area is smaller than a predetermined minimum size, the control unit may perform control for not outputting the encrypted data to the external apparatus until the data size of the used area reaches the predetermined minimum size.

If the data size of the used area is smaller than a predetermined minimum size when the new data piece is encrypted, and if the encrypted new data piece is output from the apparatus, the data can be analyzed because of its small size.

In view of this, the encryption apparatus having the stated structure performs control for not outputting the encrypted data until the data size of the used area reaches the predetermined minimum size. Thus, there is no risk that the data is acquired and analyzed by a third party while the encryption apparatus communicates with the external apparatus.

When the data size of the used area reaches the predetermined minimum and the encrypted data is output to the external apparatus, the encryption unit may generate second encrypted data beginning with a next data piece to the new data piece.

With the stated structure, the encryption apparatus is capable of generating second encrypted data beginning with a next data piece to the new data piece, when outputting the encrypted data. Thus, once the encryption apparatus outputs the encrypted data, it does not output the same data. Therefore, it is possible to prevent third parties from analyzing the encrypted data.

The encryption apparatus may further comprise: a connector operable to connect to an external apparatus for decrypting the encrypted data, wherein the control unit may output the encrypted data together with the management information to the external apparatus.

With the stated structure, the encryption apparatus outputs the encrypted data together with the management information to the external apparatus. Thus, the external apparatus can easily specify the area used for the encryption within the encrypted data.

The encryption unit may perform the encryption according to one kind of cryptography selected from the group consisting of NTRU encryption, ElGamal encryption and elliptic curve ElGamal encryption.

The encryption apparatus with the stated structure performs the encryption according to one kind of cryptography selected from the group consisting of NTRU encryption, ElGamal encryption and elliptic curve ElGamal encryption. Thus, encryption apparatus is capable of suppressing the increase of the data size while preventing the stored data from leaking even when it is analyzed.

The storage unit may be protected by an anti-tamper technology.

With the stated structure, the management information does not leak to third parties. Thus, the encryption apparatus is capable of preventing attacks from third parties conjecturing the plaintext. This improves the security of the apparatus.

Another aspect of the present invention is an encryption system including an encryption apparatus for encrypting a data piece that is smaller than a unit length for encryption and a decryption apparatus for decrypting the encrypted data piece, the encryption apparatus comprising: a storage unit operable to store therein management information indicating a used area within an encryption area defined based on the unit length, the used area being an area already used for encryption; an encryption unit operable, when encrypting a new data piece that is smaller than the unit length, to generate encrypted data by adding the new data piece to an unused area within the encryption area with reference to the management information, the unused area being an area not used for encryption; and a control unit operable to update the management information to include an area for the new data piece into the used area after the encryption unit generates the encrypted data, and output the encrypted data together with the updated management information to the decryption apparatus, and the decryption apparatus comprising: a decryption unit operable to decrypt the encrypted data input from the encryption apparatus, and extracts, from the decrypted data, a data piece existing within an area based on the used area indicated by the management information.

In the encryption system having the stated structure, the encryption apparatus generates the encrypted data by adding the new data piece to be encrypted to the unused area. Thus, it is unnecessary for the encryption apparatus to generate encrypted data having the unit length every time it encrypts a data piece that is smaller than the unit length. Therefore, the system is capable of greatly reducing the data size used for the encryption in total. Accordingly, the system is capable of suppressing the increase of the data size of the encrypted data as much as possible. Moreover, the system is capable of preventing plaintext data from leaking even when the accumulated data is analyzed, because the accumulated data is encrypted.

1. First Embodiment

The following explains the first embodiment pertaining to the present invention, with reference to the drawings.

1.1 Preparation

This section explains NTRU encryption used in this embodiment.

The following summarizes the parameter generation method, the key generation method, and the encryption and decryption methods adopted in the NTRU encryption. The explanation below is simplified because the details are described in Patent Literature 1.

(1) Parameter Generation Method of NTRU Encryption

The NTRU encryption uses parameters N, p, q, df, dg and d, which are nonnegative integers. The following explains the meanings of these parameters.

(1-1) Parameter N

The NTRU encryption is public key cryptography that performs encryption and decryption by operations with polynomials. The degree of each polynomial used in the NTRU encryption is determined by the parameter N. Each polynomial used in the NTRU encryption has integral coefficients and its degree is N−1 or less. For example, when N=5, the polynomials may be "X^4+X^3+1", etc. Here, "X^a" denotes X raised to the $a^{th}$ power. Also, a public key h, a private key f, a plaintext m, a random number r and a ciphertext c are each represented as a polynomial with the degree of N−1. The polynomial operations are performed such that the result will always be a polynomial with the degree of N−1, by using an equation "X^N=1". For example, when N=5, the product of a polynomial "X^4+X^2+1" and a polynomial "X^3+X" is calculated based on the equation "X^N=1" such that the result will always be a polynomial with the degree of N−1, in the following manner:

$$(X^{\wedge}4 + X^{\wedge}2 + 1) \times (X^{\wedge}3 + X) = X^{\wedge}7 + 2 \cdot X^{\wedge}5 + 2 \cdot X^{\wedge}3 + X =$$

$$X^{\wedge}2 \times 1 + 2 \cdot 1 + 2 \cdot X^{\wedge}3 + X = 2 \cdot X^{\wedge}3 + X^{\wedge}2 + X + 2,$$

where "×" represents the product of a polynomial and a polynomial, and "·" represents the product of an integer and a polynomial (or of an integer and an integer).

(1-2) Parameters p and q

The NTRU encryption uses parameters p and q, which are integers of two or more. The coefficients of the polynomials which occur in the NTRU encryption are each the remainder modulo p or q. The parameters p and q have to be coprime.

(1-3) Parameters df, dg and d

The parameters df, dg and d are used for selecting the polynomial f, the polynomial g and the polynomial r, respectively. The polynomial f is a part of the private key used in the NTRU encryption. The polynomial g is used together with the polynomial f to generate the polynomial h as the public key. The polynomial r shows the random number used for the encryption of the plaintext. The polynomial f is selected so that df pieces of the coefficients are 1, df−1 pieces of the coefficients are −1, and the remaining coefficients are 0. This can be restated as follows: The polynomial f is a polynomial with the degree of N−1 or less, and has N pieces of coefficients from degree 0 (i.e. constant term) to degree N−1; and the polynomial f must be selected so that, among the N pieces of the coefficients, df pieces of the coefficients are 1, df−1 pieces of the coefficients are −1, and N−2df+1 pieces of coefficients are 0. The polynomial g is selected so that dg pieces of the coefficients are 1, dg pieces of the coefficients are −1, and the remaining coefficients are 0. The polynomial r as a random number is selected so that d pieces of the coefficients are 1, d pieces of the coefficients are −1, and the remaining coefficients are 0.

The parameters for the NTRU encryption are, for example: (N, p, q, df, dg, d)=(107, 3, 64, 15, 12, 5); (N, p, q, df, dg, d)=(167, 3, 128, 61, 20, 18); or (N, p, q, df, dg, d)=(503, 3, 256, 216, 72, 55). In the following description, the parameters (N, p, q, df, dg, d)=(167, 3, 128, 61, 20, 18) are taken as an example. However, different parameters may be used. Note that the parameters affect the security level and the performance (i.e. the processing speed, the sizes of various data pieces, and so on) of the NTRU encryption. Generally, a greater parameter achieves a higher security level, but a poorer performance.

(2) Key Generation Method of the NTRU Encryption

The NTRU encryption randomly generates the polynomials f and g using the parameters df and dg, as mentioned above. Then, a polynomial Fp which satisfies Fp×f=1 (mod p) is obtained. Also, a polynomial Fq which satisfies Fq×f=1 (mod q) is assigned to an equation, $$h = Fq \times g \pmod{q}$$

to generate the polynomial h. The pair of two values (f, Fp) is the private key data (i.e. decryption key) and the value h is the public key data (i.e. encryption key). Here, x=y (mod q) is an operation to assign, to a coefficient of degree i of a polynomial x, a reminder obtained when a coefficient of degree i of a polynomial y is divided by a modulus q in a manner that the remainder falls in the range from 0 to q−1 ($0 \leq i \leq N-1$). That is, it is an operation where a mod-q operation is performed on a polynomial y so as to keep each coefficient of the polynomial y within the rage from 0 to q−1, to whereby obtain a polynomial, which is then assigned to the polynomial x. Note that when general computation apparatuses process an NTRU encryption, they hold only the coefficients of the data pieces (i.e. private key data and public key data), and they are not aware of the parts like "X^a". The cryptographic processing is performed by acting only the coefficients on each other. Thus, the private key data f is of 2·N bits (i.e., degree N×2 bits, where every 2 bits showing 0, 1 or −1), and when p is 3, the private key data Fp is of 2·N bits (i.e., degree N×2 bits, where every 2 bits showing 0, 1 or −1). When the parameter q is 128, the public key data h is of 7·N bits (i.e., N degree×7 bits, where every 7 bits showing a value in the range from 0 to 127). As mentioned above, the sign "·" represents the product of an integer and an integer).

(3) Encryption

According to the NTRU encryption, the polynomial m as the plaintext is encrypted and the polynomial c as the ciphertext is calculated (i.e. obtained). Firstly, the polynomial as the random number is randomly generated, as mentioned above. The random number r is a polynomial with the degree of N−1 or less, and has N pieces of coefficients from degree 0 (i.e. constant term) to degree N−1. Here, the polynomial r is randomly selected (i.e. generated) so that d pieces of the coefficients are 1, d pieces of the coefficients are −1, and N−2d pieces of the coefficients are 0.

By using the generated random number r (i.e. the polynomial r) and the public key h, the ciphertext c is generated by calculating "c=p·r×h+m (mod q)", where the plaint text has coefficients which are 0, 1 or −1 and its degree is N−1 or less. Note that Patent Literature 1 describes that a message m is selected from a pair of plaintexts L_m (i.e. conversion to a polynomial), and a ciphertext is generated with respect to the selected message m (i.e. plaintext m).

As explained above, this is an operation where a mod-q operation is performed so as to keep each coefficient of the polynomial p·r×h+m within the rage of 0 and (q−1), to whereby obtain a polynomial, which is then assigned to the polynomial c.

(4) Decryption

According to the NTRU encryption, the polynomial c as the ciphertext is decrypted and a polynomial m' as a decrypted text is calculated (i.e. obtained). In decryption, a polynomial a is calculated with respect to the ciphertext c, by using the polynomial f as a part of the private key as follows: a=f×c (mod q*).

Here, the operation (mod q*) is different from the operation (mod q) mentioned above. The operation (mod q*) is to assign, to a coefficient of degree i of a polynomial x, a reminder obtained when a coefficient of degree i of a polynomial f×c is divided by a modulus q in a manner that the remainder falls in the range from <−q/2>+1 to <q/2> ($0 \leq i \leq N-1$). That is, when a coefficient is in the range from <q/2> to q−1, q is subtracted so that the coefficient falls with in the above-mentioned range. Here, <x> denotes the greatest number that is no greater than x. For example, <−1/2>=−1.

Next, a polynomial b is calculated with respect to the polynomial a, by using the parameter p as follows: b=a (mod q).

Then, the decrypted text m' is calculated (i.e. obtained) with respect to the polynomial b, by using the polynomial Fp as a part of the private key as follows: m'=Fp×b (mod p*).

As explained above, the operation (mod p*) is to assign, to a coefficient of degree i of the polynomial m', a reminder obtained when a coefficient of degree i of a polynomial Fp×b is divided by a modulus p in a manner that the remainder falls in the range from <−p/2>+1 to <p/2>($0 \leq i \leq N-1$).

(5) Supplemental Explanations

Regarding the NTRU encryption, all the parameters mentioned above satisfy p=3. Meanwhile, parameters satisfying p=2 are also disclosed.

When p=3, the plaintext m is a polynomial whose coefficients are each selected from three values, namely 0, 1 and −1. On the other hand, when p=2, the plaintext m is a polynomial whose coefficients are each selected from two values, namely 0 and 1. Each of the polynomial f as the private key data, the polynomial g and the random number r is a polynomial whose coefficients are each selected from three values, namely 0, 1 and −1, regardless of P=2 or P=3.

It is also disclosed that the cryptographic processing is performed by "c=r×h+m (mod q)", where the public key h is generated by "h=p·Fq×g (mod q)".

1.2 Outline of Data Encryption System

As shown in FIG. 1, a data encryption system 1 includes a data encryption apparatus 11, a communication channel 12, and a data decryption apparatus 13.

The data encryption apparatus 11 has a function to measure the biological information of the subject, such as the body temperature. Each time the biological data piece is obtained, the data piece is accumulated in the data encryption apparatus 11 in encrypted form.

The data encryption apparatus 11 transmits the encrypted data pieces accumulated therein to the data decryption apparatus 13, in response to a request from the data decryption apparatus 13. Note that once the data encryption apparatus 11 transmits an encrypted data piece, it does not retransmit the same data piece.

The data decryption apparatus 13 acquires one or more encrypted data pieces accumulated in the data encryption apparatus 11. Furthermore, the data decryption apparatus 13 decrypts the one or more encrypted data pieces by using the decryption key, and calculates (i.e. obtains) biological data pieces in the form of plaintext data.

The communication channel 12 enables the data encryption apparatus 11 and the data decryption apparatus 13 to exchange various data pieces with each other. The communication channel 12 is, for example, the Internet, a telephone line, a dedicated line, a short-distance wireless communication channel, such as of Bluethooth and a specific low-power wireless communication method, or a USB cable.

The following shows a specific example of application of the data encryption system 1. The data encryption apparatus 11 is offered by a hospital to a patient as the subject. According to instructions from the hospital, the subject timely wears the data encryption apparatus 11 on his/her body to allow it to obtain the biological data. With certain timing, the hospital reads the encrypted data from the data encryption apparatus 11, by using the data decryption apparatus 13. Furthermore, the hospital decrypts the encrypted data by using the decryption key to obtain biological data in the form of plaintext data. Based on the obtained data, the hospital diagnoses the patient as the subject, for example.

1.3 Structure of Data Encryption Apparatus 11

Next, the structure of the data encryption apparatus 11 is described.

Figure 2:
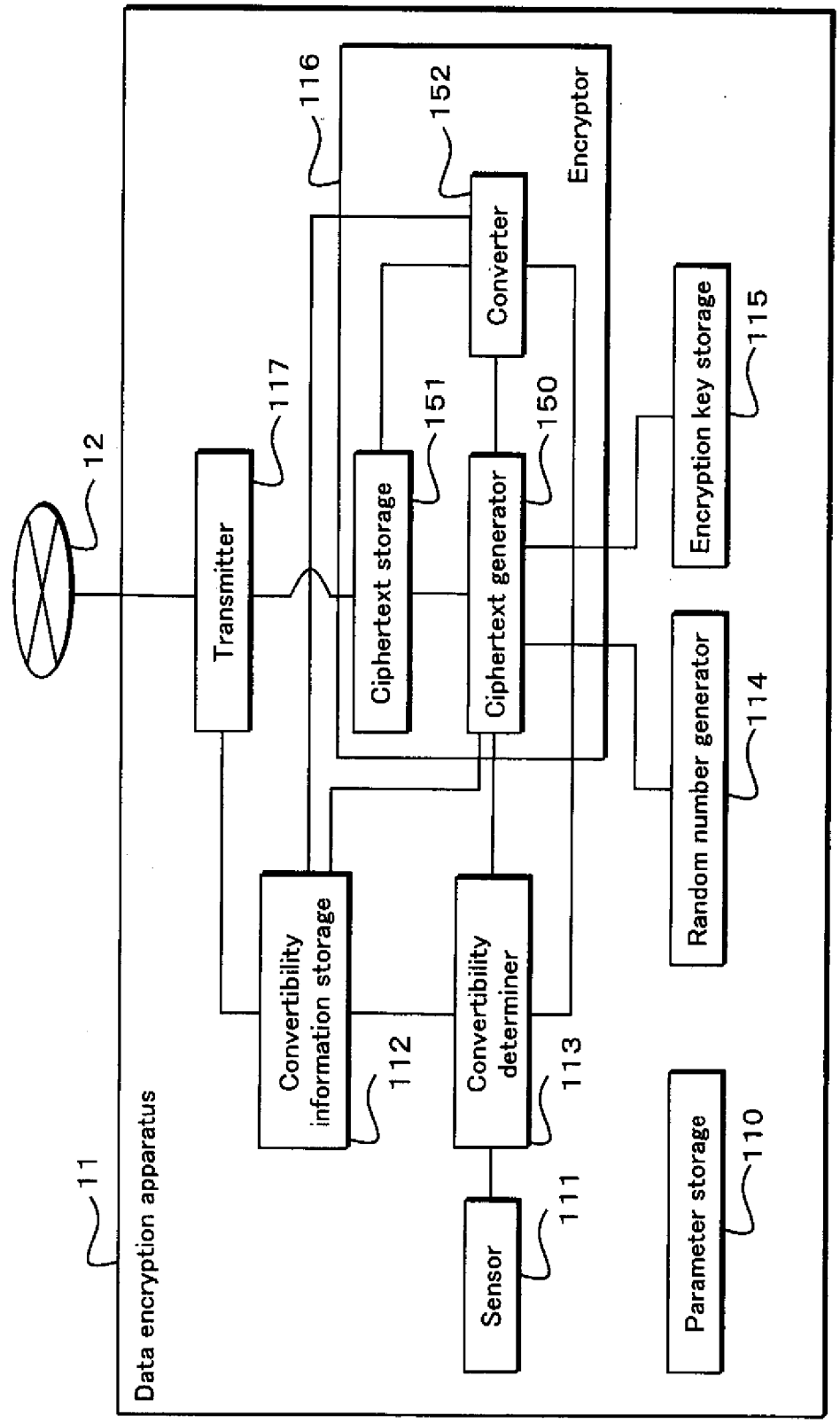
FIG. 2 is a block diagram showing a structure of a data encryption apparatus 11.

As shown in FIG. 2, the data encryption apparatus 11 includes a parameter storage 110, a sensor 111, a convertibility information storage 112, a convertibility determiner 113, a random number generator 114, an encryption key storage 115, an encryptor 116 and a transmitter 117.

(1) Parameter Storage 110

The parameter storage 110 stores beforehand the parameters (N, p, q, df, dg, d) of the NTRU encryption.

(2) Sensor 111

The sensor 111 measures data D of the subject, and concatenates the measured data D with counter information CTR, thereby generating target data TD, which is to be encrypted.

The sensor 111 outputs the generated target data TD to the convertibility determiner 113.

Here, the measured data D contains, for example, body temperature, blood pressure, blood sugar level, number of pulses, heart rate, number of steps, and amount of exercise. Specifically, in the case of the body temperature, the measured data D is 3-byte data where each of the tens place, the ones place and the first decimal place is of one byte.

The counter information CTR is a value that is incremented from 0, and is used for representing the order of the pieces of target data TD. The counter information CTR is 2-byte data where each of the tens place and the ones place is of one byte. With the counter information CTR, the sensor 111 is capable of counting to 99 at the maximum.

Note that the sensor 111 may obtain the data when triggered, instead of regularly conducting the measurement. For example, the data encryption apparatus 11 may have a button, and the sensor 111 may obtain the data when the button is pressed.

(3) Convertibility Information Storage 112

As shown in FIG. 3, the convertibility information storage 112 stores a convertibility information table T100 which contains one or more convertibility information pieces each composed of a group of a ciphertext identifier CTID, a total size TSIZE, a converted-data size USIZE, and a transmission flag UFLAG.

The ciphertext identifier CTID identifies a ciphertext data piece CTDATA stored in a ciphertext storage 151. The ciphertext storage 151 will be described later.

The total size TSIZE shows the size of data that is convertible in the initial stage, with respect to the ciphertext data piece CTDATA identified by the ciphertext identifier CTID. The total size TSIZE is measured in bits. For example, when TSIZE is 167, up to 167-bit data contained in the ciphertext data piece CTDATA in the initial state is convertible.

The converted-data size USIZE shows the size of the data that has been converted, with respect to the ciphertext data piece CTDATA identified by the ciphertext identifier CTID and stored in the ciphertext storage 151. The converted-data size USIZE is measured in bits. For example, when USIZE is 150, 150-bit data contained in the ciphertext data piece CTDATA stored in the ciphertext storage 151 has already been converted.

The transmission flag UFLAG shows whether the ciphertext data piece CTDATA identified by the ciphertext identifier CTID and stored in the ciphertext storage 151 has already been transmitted to the data decryption apparatus 13. The transmission flag UFLAG represents TRUE or FALSE. TRUE means that the ciphertext data piece CTDATA has not been transmitted yet. FALSE means that the data has already been transmitted. Here, when the transmission flag UFLAG shows TRUE, the ciphertext data piece corresponding to this flag is convertible because the data piece has not been transmitted to the data decryption apparatus 13. When the transmission flag UFLAG shows FALSE, the ciphertext data piece corresponding to this flag is not convertible because the data piece has been transmitted to the data decryption apparatus 13.

Using the information in the form of the convertibility information table T100 stored in the convertibility information storage 112, the data encryption apparatus 11 makes two or more copies of a ciphertext data piece, and performs control for not conducting the convert, with respect to the copies, with different target data pieces. This is because if a third party who attempts to intercept the output knows that the two copies are based on the same initial ciphertext data piece, he/she can specify part of the information of (i.e. the difference between) the target data pieces used for the conversion by calculating the difference between the two copies (i.e. by arithmetic subtraction). Thus, the converted-data size USIZE is used for not converting the same part of a ciphertext data piece CTDATA twice or more. Also, the transmission flag UFLAG is used for not converting again a ciphertext data piece CTDATA that has been output to the outside. This is because if there is a third party who attempts to intercept the output in the middle, he/she can specify the target data used for the conversion. Specifically, the third party can easily obtain the target data by calculating the difference (i.e. by arithmetic subtraction) between the ciphertext data piece CTDATA transmitted firstly and the ciphertext data piece CTDATA transmitted secondly.

According to the embodiment, both the total size and the converted-data size are based on the unit data length (i.e. 167 bits) of the encryptable data (i.e. the convertible data). As described above, the total size (i.e. 167 bits) shows the unit data length of the data to be encrypted, and the converted-data size shows (in data length) the area that has been used for the conversion.

Note that the total size and the converted-data size may be based on the data length of the ciphertext data piece. If this is the case, both the total size and the converted-data size are seven times larger than the case where they are based on the unit data length (i.e. 167 bits) of the convertible data.

(4) Convertibility Determiner 113

The convertibility determiner 113 receives the target data TD from the sensor 111.

The convertibility determiner 113 obtains size information SIZE, which is the data size of the received target data TD. One method for obtaining the size information is calculating it based on the target data TD itself. If the size information SIZE is a fixed value, the convertibility determiner 113 uses the predetermined fixed value as it is unnecessary to calculate it. Alternatively, the convertibility determiner 113 may obtain the size information SIZE from the sensor 111.

Next, the convertibility determiner 113 accesses the convertibility information storage 112, and checks whether any of the ciphertext identifiers (CTIDs) stored in the convertibility information storage 112 satisfy a certain condition, one by one in the ascending order of the CTIDs. The condition is that the transmission flag UFLAG indicates TRUE and the total size TSIZE decreased by the converted-data size USIZE is greater than the size information SIZE.

If even one such a ciphertext identifier CTID exists in the convertibility information storage 112, the convertibility determiner 113 outputs the target data TD and the corresponding CTID(s) to a converter 152.

If no such a ciphertext identifier CTID exists, the convertibility determiner 113 outputs the target data TD and a ciphertext generation request signal REQCT to a ciphertext generator 150.

Note that the size information SIZE may change every time.

(5) Random Number Generator 114

The random number generator 114 generates a random number in response to a request from the ciphertext generator 150, and outputs the generated random number to the ciphertext generator 150. The ciphertext generator 150 will be described later.

Specifically, on receipt of a random number generation request from the ciphertext generator 150, the random number generator 114 generates a random number r as a polynomial, based on the parameters N, df, dg and d stored in the parameter storage 110.

Here, the random number r is a polynomial with the degree of N−1 or less, namely a polynomial having N coefficients from degree 0 (i.e. constant term) to degree N−1. Here, the random number generator 114 generates a random number r (i.e. polynomial r) so that, among N coefficients, d pieces of the coefficients are 1, d pieces of the coefficients are −1, and N−2d pieces of the coefficients are 0.

(6) Encryption Key Storage 115

The encryption key storage 115 stores encryption key data EK for the public key cryptography.

Specifically, the encryption key data EK is the public key h of the NTRU encryption.

(7) Encryptor 116

As shown in FIG. 2, the encryptor 116 includes a ciphertext generator 150, a ciphertext storage 151 and a converter 152.

The encryptor 116 receives, from the convertibility determiner 113, a pair of target data TD and a ciphertext generation request signal REQCT, or a pair of target data TD and a ciphertext identifier CTID, and encrypts the received target data TD.

(7-1) Ciphertext Generator 150

On receipt of the ciphertext generation request signal REQCT from the convertibility determiner 113, the ciphertext generator 150 acquires the public key h from the encryption key storage 115.

The ciphertext generator 150 generates a ciphertext data piece CTDATA according to the NTRU encryption, by using the public key h.

The following explains how to generate the ciphertext data piece CTDATA. First, the ciphertext generator 150 outputs a random number generation request to the random number generator 114. Next, the ciphertext generator 150 receives a random number r from the random number generator 114. Then, the ciphertext generator 150 calculates (i.e. generates) the ciphertext data piece CTDATA=p·r×h (mod q) by using the received random number r, the public key h (i.e. encryption key data EK) stored in the encryption key storage 115, and the parameters p and q stored in the parameter storage 110.

This calculation is, as described above, an operation where a mod-q operation is performed on a polynomial p·r×h so as to keep each coefficient of the polynomial p·r×h within the rage from 0 to q−1, to whereby obtain a polynomial, which is then assigned to the polynomial c (=CTDATA).

The ciphertext generator 150 generates a new ciphertext identifier CTID that has not been used in the ciphertext storage 151. For this purpose, the ciphertext generator 150 may use a counter, or add 1 to the ciphertext identifier CTID that is being used.

The ciphertext generator 150 stores the generated pair of the ciphertext identifier CTID and the ciphertext data piece CTDATA into the ciphertext storage 151. Furthermore, the ciphertext generator 150 stores, in the convertibility information storage 112, a total size TSIZE indicating 167, a converted-data size USIZE indicating 0, and a transmission flag UFLAG indicating TRUE, in association with the ciphertext identifier CTID generated in advance.

The ciphertext generator 150 outputs the generated ciphertext identifier CTID to the converter 152.

Note that the information to be written into the convertibility information storage 112 as the initial values is not limited to those described above, because it depends on the parameters used for the generation of the encryption key data EK stored in the encryption key storage 115.

The following are the differences from conventional types of cryptography.

According to conventional types of cryptography, encryption of a plaintext m (i.e. polynomial m) is performed by "p·r×h+m (mod q)". On the other hand, the ciphertext generator 150 here performs only the "p·r×h" operation, but does not performs the addition to the plaintext m (i.e. "+m" in the last of the operation for conventional types of cryptography, which shows merging with the message). In comparison with Patent Literature 1, the ciphertext generator 150 is different in the following points: the ciphertext generator 150 does not select the message m from the pair of plaintexts L_m (i.e. conversion to a polynomial); and the ciphertext generator 150 does not perform the addition to m (i.e. "+m" in the last of the operation for conventional types of cryptography, which shows merging with the message).

In other words, the ciphertext data piece CTDATA is the data in the state immediately before the encryption of the plaintext m.

According to the NTRU encryption, the unit data length of a plaintext is N bits, and the corresponding ciphertext size is 7·N bits (when the parameter q is 128). Thus, with respect to one ciphertext data piece CTDATA, the maximum size that is convertible by the converter 152 (i.e. the total size of the message that can be embedded) is 7·N bits (when the parameter q is 128). The converter 152 will be descried later.

Note that the one-time encryption key pertaining to the present invention is equivalent to the ciphertext data piece CTDATA in the state immediately before the encryption of the plaintext m.

(7-2) Ciphertext Storage 151

Figure 4:
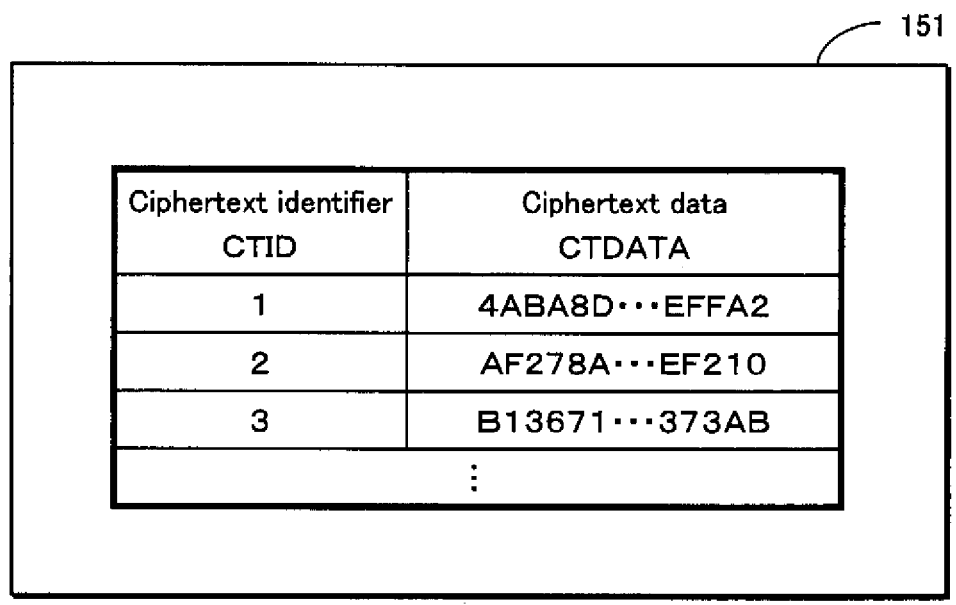
FIG. 4 shows an example data structure of data in a ciphertext storage 151.

As shown in FIG. 4, the ciphertext storage 151 stores one or more pairs of a ciphertext identifier CTID and a ciphertext data piece CTDATA.

Here, each ciphertext identifier CTID corresponds to one of the values stored in the convertibility information storage 112. Each ciphertext data piece CTDATA is a ciphertext data piece encrypted with the public key data of the NTRU encryption.

(7-3) Converter 152

The converter 152 obtains size information SIZE, which is the data size of the target data TD received from the convertibility determiner 113. Applicable methods for obtaining the size information are the same as those for the convertibility determiner 113, and thus the explanation is omitted here.

The converter 152 calculates a message m as a vectorized polynomial (with coefficients $m\_1, \ldots, m\_(SIZE)$) based on the target data TD. According to the NTRU encryption, the coefficients of the message m is a polynomial whose coefficients are each selected from three values, namely 0, 1 and −1 when p=3. On the other hand, when p=2, the message m is a polynomial whose coefficients are each selected from two values, namely 0 and 1. The conversion to a polynomial is performed by, for example, binarizing the target data TD and using each value as a coefficient of the polynomial.

On receipt of a ciphertext identifier CTID from the convertibility determiner 113 or the ciphertext generator 150, the converter 152 accesses the ciphertext storage 151, and acquires the ciphertext data piece CTDATA that corresponds to the received ciphertext identifier CTID. Next, the converter 152 accesses the convertibility information storage 112, and acquires the converted-data size USIZE that corresponds to the ciphertext identifier CTID.

The converter 152 determines the part of the acquired ciphertext data piece CTDATA where is to be converted with the target data TD, based on the acquired converted-data size USIZE. Specifically, when the coefficients of the polynomial of the ciphertext data piece CTDATA are "e_1" (i.e. coefficient of degree 0 of a polynomial e), "e_2" (i.e. coefficient of degree 1 of the polynomial e), ..., and "e_N" (i.e. coefficient of degree N−1 of the polynomial e), the part to be converted is in the range from the coefficient of degree USIZE to the coefficient of degree USIZE+SIZE−1. In other words, the part to be converted is e_(USIZE+1), e_(USIZE+2), ..., and e_(USIZE+SIZE). This operation is by the addition "+" in the polynomial, in the same manner as described on Page 35 (1.3 Encoding) of Patent Literature 1. The message m, which is a polynomial generated from the target data TD, is added to particular parts of the ciphertext data piece CTDATA. Specifically, m_1 (i.e. the coefficients of degree 0 of the polynomial m) is added to e_(USIZE+1), m_2 (i.e. the coefficients of degree 1 of the polynomial m) is added to e_(USIZE+2), ..., m_(SIZE) (i.e. the coefficients of degree SIZE−1 of the polynomial m) is added to e_(USIZE+SIZE). Note that the (mod q) operation is performed so as to keep each coefficient within the rage from 0 to q−1.

After that, the converter 152 overwrites the ciphertext data piece CTDATA after the conversion on the same area of the ciphertext storage 151. Finally, the converter 152 adds the size information SIZE to the converted-data size USIZE that corresponds to the ciphertext identifier CTID and is stored in the convertibility information storage 112.

Specific Example

The following describes the case of encrypting a plaintext m#1 and a plaintext m#2, with reference to FIGS. 5A and 5B. Each of the plaintexts m#1 and m#2 is a polynomial with the degree of s−1.

FIG. 5A shows the changes in the converted-data size USIZE. In this example, the unit data length for the encryption is the total size TSIZE (=167).

First, if the encryption has not been performed even once, the value of the converted-data size USIZE in the unit length D10 for the encryption is "0". If this is the case, when the plaintext m#1 (SIZE=s) is encrypted, the size indicated by the size information SIZE out of the total size TSIZE is spent for the encryption. Consequently, USIZE=s is satisfied (See the unit length D11). Next, when the plaintext m#2 (SIZE=s) is encrypted, the size indicated by the size information SIZE is spent for the encryption. Thus, the value s is further added to the USIZE after the encryption of the plaintext m#1. Consequently, USIZE=2s is satisfied (See the unit length D12).

FIG. 5B shows the changes in the ciphertext data.

First, the ciphertext generator 150 generates ciphertext data D100, which is the data immediately before the plaintext m is encrypted by the "p·r×h" operation, and stores it into the ciphertext storage 151. At this moment, the converted-data size USIZE that corresponds to the ciphertext data D100, which is to be stored in the convertibility information storage 112, is 0. As described above, the data length of the ciphertext data D100 is seven times 167 bits, or 1169 bits.

To encrypt the plaintext m#1, the converter 152 acquires the ciphertext data D100 from the ciphertext storage 151, and acquires the converted-data size corresponding to the ciphertext data D100 from the convertibility information storage 112.

Since the value of the acquired converted-data size USIZE is 0, the converter 152 adds the coefficients m_1 (i.e. a coefficient of degree 0), m_2 (i.e. a coefficient of degree 1), ..., and m_s (i.e. a coefficient of degree s−1) of the polynomial of the plaintext m#1 to e_1, e_2, ..., and e_s, respectively, thereby generating ciphertext data D101, which is the data converted with the plaintext m#1. Then, the converter 152 updates the ciphertext data D100 stored in the ciphertext storage 151 to the ciphertext data D101. Furthermore, as shown in FIG. 5A, the converter 152 updates the converted-data size USIZE that corresponds to the ciphertext data D101, which is stored in the convertibility information storage 112, from 0 to s. This means, in the case where the converted-data size USIZE is based on the unit length (i.e. 167 bits) of the encryptable data (i.e. the convertible data), that s bits out of the unit length (i.e. 167 bits) have been spent. Note that in the case where the converted-data size USIZE is based on the data length of the ciphertext data D100 (i.e. 1169 bits), the converted-data size USIZE is updated from 0 to 7·s.

To encrypt the plaintext m#2, the converter 152 acquires the ciphertext data D101 from the ciphertext storage 151, and acquires the converted-data size corresponding to the ciphertext data D101 from the convertibility information storage 112.

Since the value of the acquired converted-data size USIZE is s, the converter 152 adds the coefficients m'_1 (i.e. a coefficient of degree 0), m'_2 (i.e. a coefficient of degree 1), ..., and m'_s (i.e. a coefficient of degree s−1) of the polynomial of the plaintext m#2 to e_(s+1), e_(s+2), ..., and e_(s+s), respectively, thereby generating ciphertext data D 102. Then, the converter 152 updates the ciphertext data D101 stored in the ciphertext storage 151 to the ciphertext data D102. Furthermore, the converter 152 updates the converted-data size USIZE that corresponds to the ciphertext data D102, which is stored in the convertibility information storage 112, from s to 2s. This means, in the case where the converted-data size USIZE is based on the unit length (i.e. 167 bits) of the encryptable data (i.e. the convertible data), that 2s bits out of the unit length (i.e. 167 bits) have been spent. Note that in the case where the converted-data size USIZE is based on the data length of the ciphertext data D100 (i.e. 1169 bits), the converted-data size USIZE is updated from 0 to 7.2s (=14s).

Next, operations performed on the plaintexts m#1 and m#2 are described based on an example, with reference to FIGS. 6A to 6C.

As shown in FIG. 6A, the ciphertext generator 150 generates the ciphertext data D100 by calculating "p·r×h (mod q)" in the following manner:

$$CTDATA = p \cdot r \times h(\bmod q) =$$
$$e\_1 + e\_2 \times X + \ldots + e\_s \times X^{\wedge}(s-1) + e\_(s+1) \times X^{\wedge}s +$$
$$e\_(s+2) \times X^{\wedge}(s+1) + \ldots + e\_2s \times X^{\wedge}(2s) + \ldots + e\_N \times X^{\wedge}(N-1).$$

To encrypt the plaintext m#1, the converter 152 multiplies the polynomial of the plaintext m#1 by $X^{\wedge}(USIZE)$, and adds the result to the ciphertext data D100, as shown in FIG. 6B.

That is, as shown in FIG. 6B, the converter 152 can add the coefficients m__1 (i.e. a coefficient of degree 0), m__2 (i.e. a coefficient of degree 1), . . . , and m_s (i.e. a coefficient of degree s−1) of the polynomial of the plaintext m#1 to e__1, e__2, . . . , and e_s, respectively, by calculating CTDATA+m#1×$X^{\wedge}(USIZE)$ with respect to the ciphertext data (i.e. CTDATA) D100.

Furthermore, to encrypt the plaintext m#2, the converter 152 multiplies the polynomial of the plaintext m#2 by $X^{\wedge}(USIZE)$, and adds the result to the ciphertext data D101, as shown in FIG. 6C.

That is, as shown in FIG. 6C, the converter 152 can add the coefficients m'__1 (i.e. a coefficient of degree 0), m'__2 (i.e. a coefficient of degree 1), . . . , and m'_s (i.e. a coefficient of degree s−1) of the polynomial of the plaintext m#2 to e_(s+1), e_(s+2), . . . , and e_(s+s), respectively, by calculating CTDATA+m#2×$X^{\wedge}(USIZE)$ with respect to the ciphertext data (i.e. CTDATA) D101.

Here, as can be seen from FIGS. 6B and 6C, in the encryption (i.e. conversion) of the plaintext m#2 with the ciphertext data D101, the coefficients m'__1, m'__2, . . . , and m'_s of the polynomial of the plaintext m#2 are added such that the plaintext m#1 has no influence on the coefficients of degree 0 to s−1 of the ciphertext data D101 used for the encryption (i.e. conversion).

The point of this operation is that the target data is prevented from being added to the same bit position of the ciphertext data piece CTDATA twice or more. Any method may be used as long as it satisfies the point. Note that when general computation apparatuses process an NTRU encryption, they hold only the coefficients of the data pieces (i.e. private key data and public key data), and the cryptographic processing is performed by acting only the coefficients on each other.

(8) Transmitter 117

On receipt of a request from the data decryption apparatus 13, the transmitter 117 performs processing for transmitting the ciphertext data piece CTDATA stored in the ciphertext storage 151 to the data decryption apparatus 13 via the communication channel 12.

First, on receipt of a transmission request for data from the data decryption apparatus 13, the transmitter 117 accesses the convertibility information storage 112, and checks whether any of the ciphertext identifiers (CTIDs) stored in the convertibility information storage 112 satisfy a certain condition. The condition is that the transmission flag UFLAG indicates TRUE and the converted-data size USIZE is no less than a predetermined size. The predetermined size is 80, for example. This is for not allowing a malicious third party to analyze a ciphertext when a ciphertext in which no more than a given number of bits of the ciphertext have been converted is transmitted. The procedures for the analysis are as follows:

Step 1: For the public key h, calculate inv_h that satisfies h×inv_h=1 (mod q).

Step 2: Assume that the plaintext data candidate value including the converted part is m'. Also assume that the value of the converted part is an expected value, and the value of the remaining part is 0.

Step 3: For the ciphertext data piece CTDATA, calculate a first intermediate value CV1=CTDATA−m', as a polynomial.

Step 4: For the first intermediate value CV1, calculate a second intermediate value CV2=p·CV1×inv_h, as a polynomial.

Step 5: For the second intermediate value CV2 as a polynomial, check whether all the coefficients satisfy the condition at the generation of the random number r (i.e. Among the N pieces of coefficients, d pieces of the coefficients are 1, d pieces of the coefficients are −1, and N−2d pieces of coefficients are 0). If the condition is satisfied, output the plaintext data candidate value m' assumed in Step 2, as the correct plaintext data m. If the condition is not satisfied, replace the plaintext data candidate value m' with another value, and repeat Steps 3-5.

Here, the reason why no less than a predetermined size is converted is that the increased number of patterns assumed in Step 2 prevents the analyzer from trying all the combinations.

If no ciphertext identifier CTID stored in the convertibility information storage 112 satisfy the certain condition, the transmitter 117 determines that no information is to be transmitted to the data decryption apparatus 13, and notifies the decryption apparatus 13 of that. If any ciphertext identifier CTID satisfies the certain condition, the transmitter 117 sets FALSE to the transmission flag UFLAG thereof, acquires the ciphertext data piece CTDATA that corresponds to the ciphertext identifier CTID from the ciphertext storage 151, and transmits the ciphertext identifier CTID and the converted-data size USIZE to the decryption apparatus 13 via the communication channel 12.

The transmitter 117 sets FALSE to the transmission flags (UFLAGs) corresponding to the ciphertext identifiers (CTIDs) associated with one or more ciphertext data pieces (CTDATAs) transmitted in the processing for the transmission.

1.4 Operations of Data Encryption Apparatus 11

This section explains example operations of the data encryption apparatus 11. In the following, the operations for the measurement and the operations for the data transmission are explained separately.

(1) Operations for Measurement

Figure 7:
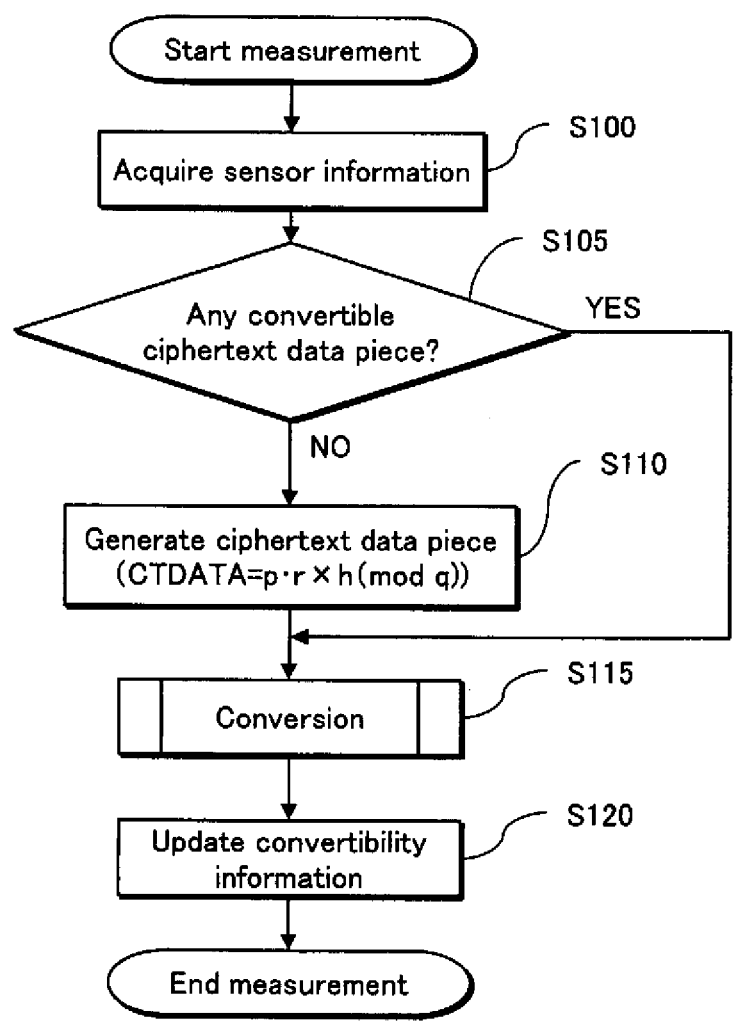
FIG. 7 is a flowchart showing operations for measurement performed by the data encryption apparatus 11.

The following describes the operations for the measurement, with reference to the flowchart shown in FIG. 7.

The sensor 111 obtains biological information BD of the subject, and outputs target data TD, with which counter information CTR is concatenated, to the convertibility determiner 113 (Step S100).

The convertibility determiner 113 receives the target data TD from the sensor 111. The convertibility determiner 113 acquires the size information SIZE, which shows the data size of the target data TD. Then, the convertibility determiner 113 accesses the convertibility information storage 112, and checks whether any of the ciphertext identifiers (CTIDs) stored in the convertibility information storage 112 satisfy a certain condition, one by one in the ascending order of the CTIDs. The condition is that the transmission flag UFLAG indicates TRUE and the total size TSIZE decreased by the converted-data size USIZE is greater than the size information SIZE (Step S105).

If determined that such a ciphertext identifier CTID exists ("YES" in Step S105), the convertibility determiner 113 determines that the received target data is convertible to the ciphertext data CTDATA that corresponds to the ciphertext identifier CTID. The convertibility determiner 113 outputs the ciphertext identifier CTID and the target data TD to the converter 152. Then, the measurement processing moves to Step S115.

If determined that such a ciphertext identifier CTID does not exist ("NO" in Step S105), the convertibility determiner 113 outputs a ciphertext generation request signal REQCT and the target data TD to the encryptor 116.

On receipt of the ciphertext generation request signal REQCT from the convertibility determiner 113, the encryptor 116 of the ciphertext generator 150 outputs a random number generation request to the random number generator 114. After that, the ciphertext generator 150 receives a random number r from the random number generator 114. Then, the ciphertext generator 150 acquires the public key h from the encryption key storage 115. The ciphertext generator 150 generates the ciphertext data piece CTDATA (=p·r×h (mod q)) by using the acquired public key h, the random number r, and the parameters p and q stored in the parameter storage 110. Next, the ciphertext generator 150 generates a new ciphertext identifier CTID that has not been used in the ciphertext storage 151, and stores the generated pair of the ciphertext identifier CTID and the ciphertext data piece CTDATA into the ciphertext storage 151. Furthermore, the ciphertext generator 150 sets the initial value to the total size TSIZE, the initial value (i.e. TRUE) to the transmission flag UFLAG, and the initial value (i.e. 0) to the converted-data size USIZE, and adds them to the convertibility information storage 112 in association with the ciphertext identifier CTID generated in advance. Finally, the ciphertext generator 150 outputs the ciphertext identifier CTID and the target data TD to the converter 152 (Step S110).

The converter 152 receives the ciphertext identifier CTID from the convertibility determiner 113 or the ciphertext generator 150, and also receives the target data TD from the convertibility determiner 113. The converter 152 encrypts the target data TD by using the ciphertext data that corresponds to the received ciphertext identifier CTID. That is, the converter 152 converts the ciphertext data piece that corresponds to the received ciphertext identifier CTID to be a ciphertext data piece in which the received target data TD is embedded (Step S115).

The converter 152 updates the convertibility information that corresponds to the ciphertext data to be converted, by adding the size information SIZE to the converted-data size USIZE that corresponds to the ciphertext identifier CTID and is stored in the convertibility information storage 112 (Step S120).

<Conversion>

Figure 8:
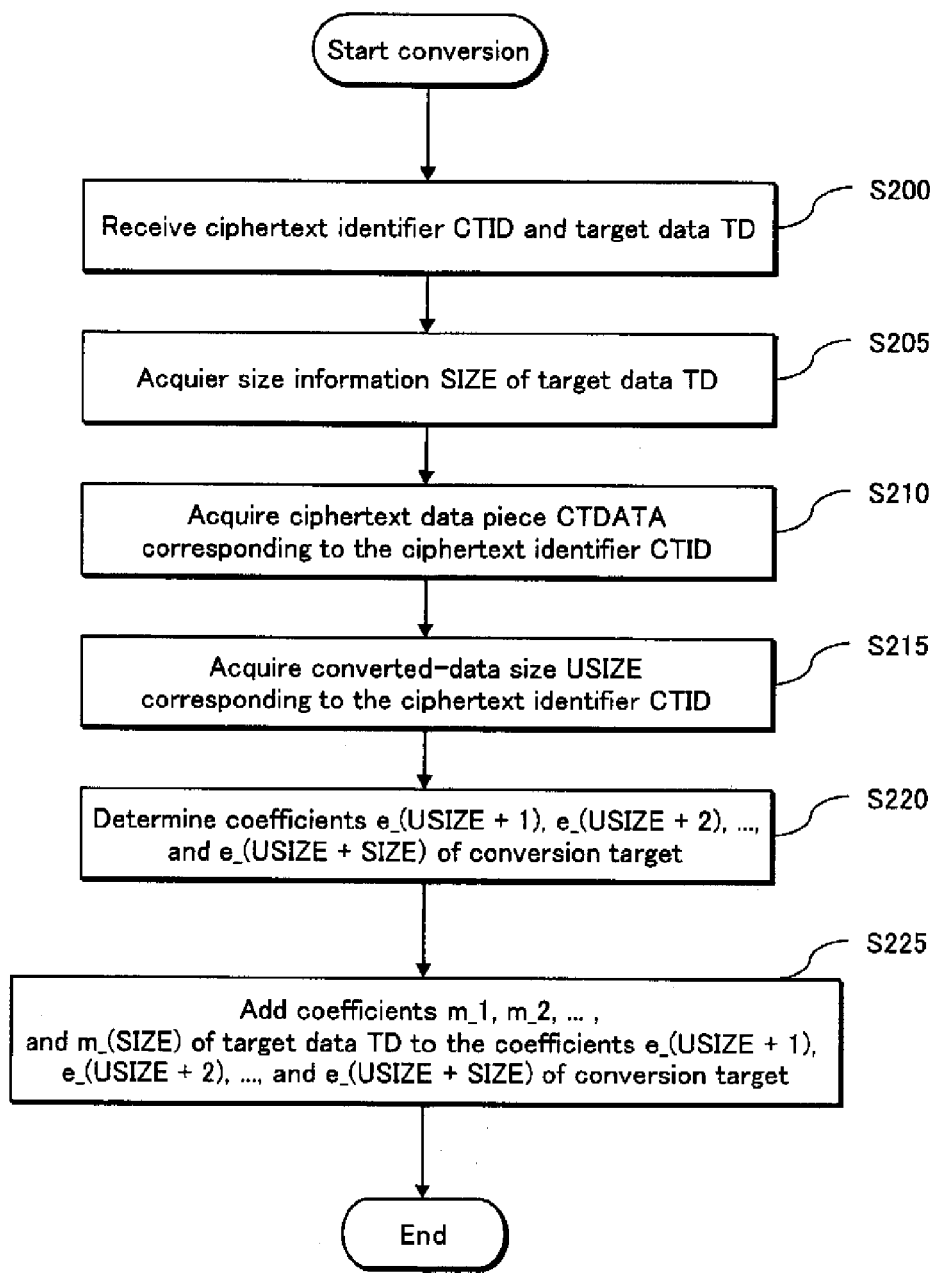
FIG. 8 is a flowchart showing operations for conversion.

This section explains the conversion performed in Step S115, with reference to the flowchart shown in FIG. 8.

The converter 152 receives the ciphertext identifier CTID from the convertibility determiner 113 or the ciphertext generator 150, and also receives the target data TD from the convertibility determiner 113 (Step S200).

The converter 152 acquires the size information SIZE, which shows the data size of the received target data TD (Step S205).

The converter 152 accesses the ciphertext storage 151, and acquires the ciphertext data piece CTDATA that corresponds to the ciphertext identifier CTID (Step S210).

The converter 152 accesses the convertibility information storage 112, and acquires the converted-data size USIZE that corresponds to the ciphertext identifier CTID (Step S215).

The converter 152 determines the part of the acquired ciphertext data piece CTDATA where is to be converted with the target data TD, based on the acquired converted-data size USIZE. That is, the converter 152 determines the coefficients $e\_(USIZE+1)$, $e\_(USIZE+2)$, ..., and $e\_(USIZE+SIZE)$ of the conversion target (Step S220).

The converter 152 adds the coefficients $m\_1, m\_2, \ldots$, and $m\_(SIZE)$ of the target data TD to the coefficients $e\_(USIZE+1)$, $e\_(USIZE+2)$, ..., and $e\_(USIZE+SIZE)$ of the conversion target, respectively, thereby generating ciphertext data piece CTDATA in which the target data TD is embedded (Step S225).

<Specific Example of Step S105>

The following describes specific examples at the determination performed in Step S105, with reference to FIGS. 9A and 9B.

FIG. 9A shows the case where the total (i.e. USIZE+SIZE) of the converted-data size USIZE of the ciphertext data D200 and the size SIZE of the target data TD is not greater than the total size TSIZE of the ciphertext data D200 having the unit length for the encryption. If this is the case, the convertibility determiner 113 determines, in Step S105, that the target data TD is convertible (i.e. encryptable) with the existing ciphertext data, and that the corresponding ciphertext identifier CTID exists.

FIG. 9B shows the case where the total (i.e. USIZE+SIZE) of the converted-data size USIZE of the ciphertext data D200 and the size SIZE of the target data TD is greater than the total size TSIZE of the ciphertext data D200 having the unit length for the encryption. If this is the case, the convertibility determiner 113 determines, in Step S105, that the target data TD is not convertible (i.e. encryptable) with the existing ciphertext data, and performs the same processing on another ciphertext data piece with which the target data TD is convertible (i.e. encryptable).

Here, the examples are based on the unit length (i.e. 167 bits) of the encryptable data (i.e. convertible data). In the case the sizes are based on the data length (i.e. 1169 bits) of the ciphertext data D100, the determination is performed after multiplying each of the total size, the converted-data size and the size of the target data TD by 7, as described above.

(2) Operations for Data Transmission

The following describes the operations for the data transmission, with reference to the flowchart shown in FIG. 10.

The transmitter 117 receives a transmission request from the data decryption apparatus 13 (Step S300).

The transmitter 117 accesses the convertibility information storage 112, and checks whether any of the ciphertext identifiers (CTIDs) stored in the convertibility information storage 112 satisfy a certain condition. The condition is that the transmission flag UFLAG indicates TRUE and the converted-data size USIZE is no less than a predetermined size (Step S305).

If judged that no such a ciphertext identifier CTID exists ("NO" in Step S305), the transmitter 117 notifies the decryption apparatus 13 of that no information is to be transmitted to the data decryption apparatus 13, and finishes the processing.

If judged that such a ciphertext identifier CTID exists ("YES" in Step S305), the transmitter 117 acquires the ciphertext data pieces (CTDATAs) that corresponds to the one or more ciphertext identifiers (CTIDs) and whose converted-data size USIZE is no less than a predetermined size, from the ciphertext storage 151 (Step S310).

The transmitter 117 acquires the converted-data sizes (USIZEs) that correspond to the acquired ciphertext identifiers (CTIDs) from the convertibility information storage 112 (Step S315).

The transmitter 117 transmits the acquired ciphertext data pieces (CTDATAs) and their corresponding converted-data sizes (USIZEs) associated one-to-one with each other to the decryption apparatus 13 via the communication channel 12 (Step S320).

The transmitter 117 sets FALSE to the transmission flags (UFLAGs) that correspond to the one or more ciphertext identifiers (CTIDs) transmitted in the transmission processing (Step S325).

1.5 Structure of Data Decryption Apparatus 13

Next, the structure of the data decryption apparatus 13 is described.

Figure 11:
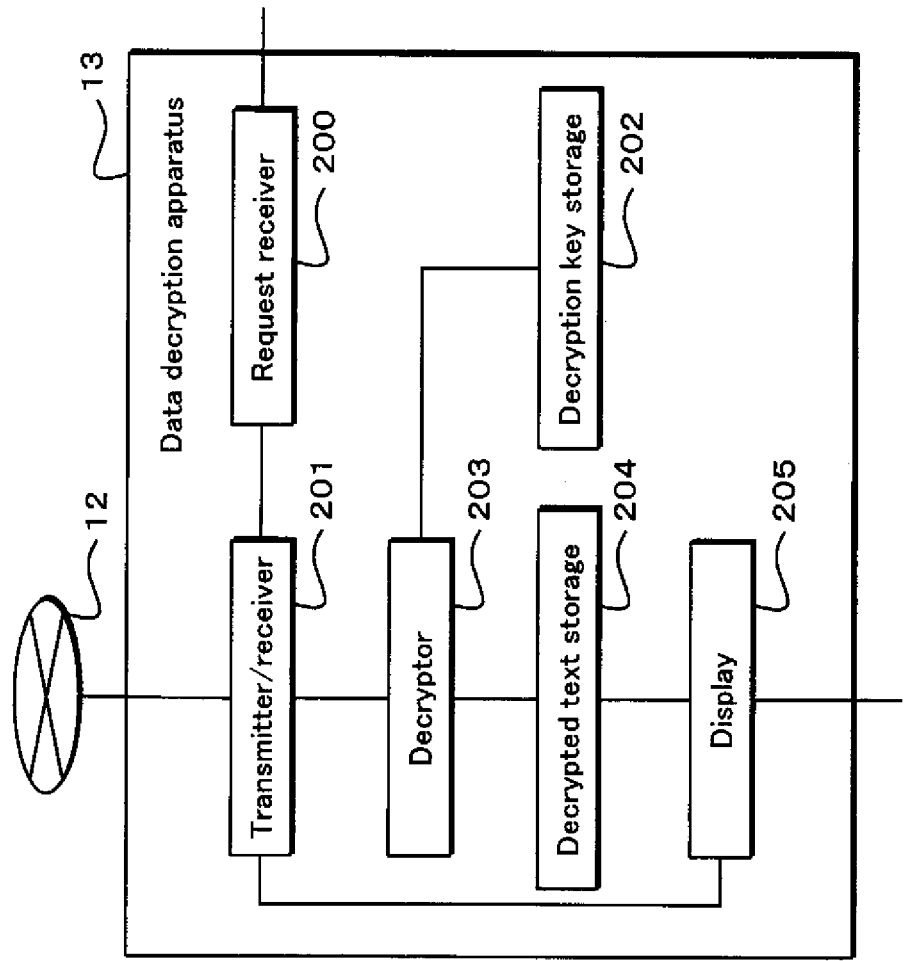
FIG. 11 is a block diagram showing the structure of a data decryption apparatus 13.

As shown in FIG. 11, the data decryption apparatus 13 includes a request receiver 200, a transmitter/receiver 201, a decryption key storage 202, a decryptor 203, a decrypted text storage 204, and a display 205.

(1) Request Receiver 200

The request receiver 200 outputs a transmission request to the transmitter/receiver 201 on receipt of an instruction from a user to collect the measured data D.

(2) Transmitter/Receiver 201

The transmitter/receiver 201 transmits the transmission request to the data encryption apparatus 11 via the communication channel 12 on receipt of the transmission request from the request receiver 200.

The transmitter/receiver 201 receives one or more ciphertext data pieces (CTDATAs) and the converted-data sizes (USIZEs) that correspond to the ciphertext data pieces (CTDATAs) respectively, from the data encryption apparatus 11 via the communication channel 12. The transmitter/receiver 201 outputs the received ciphertext data pieces (CTDATAs) and converted-data sizes (USIZEs) to the decryptor 203.

In the case of receiving, from the data encryption apparatus 11, information showing that there is no information to be transmitted, the transmitter/receiver 201 outputs the received information to the display 205.

(3) Decryption Key Storage 202

The decryption key storage 202 stores decryption key data DK for the public key cryptography.

Here, the decryption key data DK stored in the decryption key storage 202 is the private key (f, Fp) of the NTRU encryption that corresponds to the public key h stored in the encryption key storage 115. The method for generating the private key for the NTRU encryption is omitted, because it is described above.

(4) Decryptor 203

The decryptor 203 performs decryption according to the public key cryptography.

The decryptor 203 stores in advance the size of the data consisting of the measured data D and the counter information CRT. Note that it is assumed in this embodiment that the size of the data consisting of the measured data D and the counter information CRT is 5 bytes.

On receipt of the ciphertext data pieces (CTDATAs) and the converted-data sizes (USIZEs) from the transmitter/receiver 201, the decryptor 203 accesses the decryption key storage 202, and acquires the private key (f, Fp) for the NTRU encryption, as the decryption key data DK.

The decryptor 203 decrypts each of the received one or more ciphertext data pieces CTDATAs according to the NTRU encryption, by using the acquired private key (f, Fp).

Since the decryption of the encrypted data is described in the section 1.1 (4) above, the following provides a simplified explanation. Note that the details of the decryption are described on Pages 35-36 (1.4 Decoding) of Patent Literature 1. The basis for the decryption is described as well, on Page 36 (1.5 Why Decoding Works) of Patent Literature 1.

<Decryption Method According to NTRU Encryption>

The decryptor 203 decrypts a ciphertext data piece DTDATA which is a polynomial, and calculates (i.e. obtains) decrypted DTDATA which also is a polynomial.

The decryptor 203 stores in advance the parameters (N, p, q, df, dg, d) according to the NTRU encryption.

With respect to the ciphertext data DTDATA, the decryptor 203 obtains a polynomial "a" by using polynomial "f" as a part of the private key (i.e. decryption key), as follows: a=f×c (mod q*).

Next, with respect to the polynomial "a", the decryptor 203 generates a polynomial "b" by using the parameter p, as follows: b=a (mod p).

Then, with respect to the polynomial "b", the decryptor 203 calculates (i.e. obtains) a temporal decrypted text data piece x by using a polynomial Fp as a part of the private key (i.e. decryption key), as follows: x=Fp×b (mod p*).

From the calculated data piece x, the decryptor 203 extracts elements x' (hereinafter called "message x'") for the converted-data size USIZE, from the first element. Specifically, the decryptor 203 extracts x_1, . . . , and x_(USIZE), and discards x_(USIZE+1), . . . , and x_N.

From the message x' as a polynomial having coefficients x_1, . . . , and x_(USIZE), the decryptor 203 acquires one or more decrypted text data pieces (DTDATAs) consisting of the measured data D and the counter information CTR corresponding thereto, and stores the acquired decrypted text data pieces (DTDATAs) into the decrypted text storage 204. Specifically, the decryptor 203 divides the coefficients of the message x' into groups each consisting of five coefficients by using the prestored value "5", from the first coefficient (i.e. coefficient of degree 0), thereby obtaining the one or more decrypted text data pieces (DTDATAs).

(5) Decrypted Text Storage 204

Figure 12:
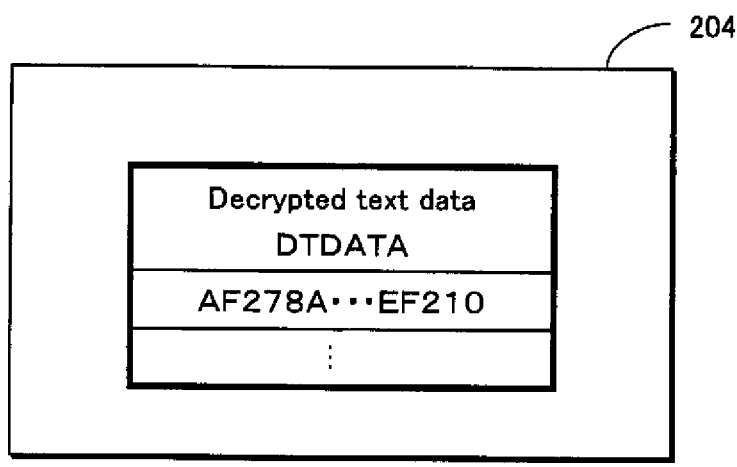
FIG. 12 shows an example data structure of data in a ciphertext storage 204.

As shown in FIG. 12, the decrypted text storage 204 stores a plural decrypted text data pieces (DTDATAs).

(6) Display 205

The display 205 shows the decrypted text data pieces (DTDATAs) stored in the decrypted text storage 204. The display shows, based on the counter information included in the decrypted text data, the transition of the values of the corresponding measured data D on a graph.

Also, in the case of receiving, from the transmitter/receiver 201, information showing that there is no information to be transmitted, the display 205 shows that the number of ciphertext data pieces received from the data encryption apparatus 11 is 0.

1.6 Operations of Data Decryption Apparatus 13

This section explains example operations of the data decryption apparatus 13. In the following, the operations for receiving data are explained.

(1) Operations for Receiving Data

Figure 13:
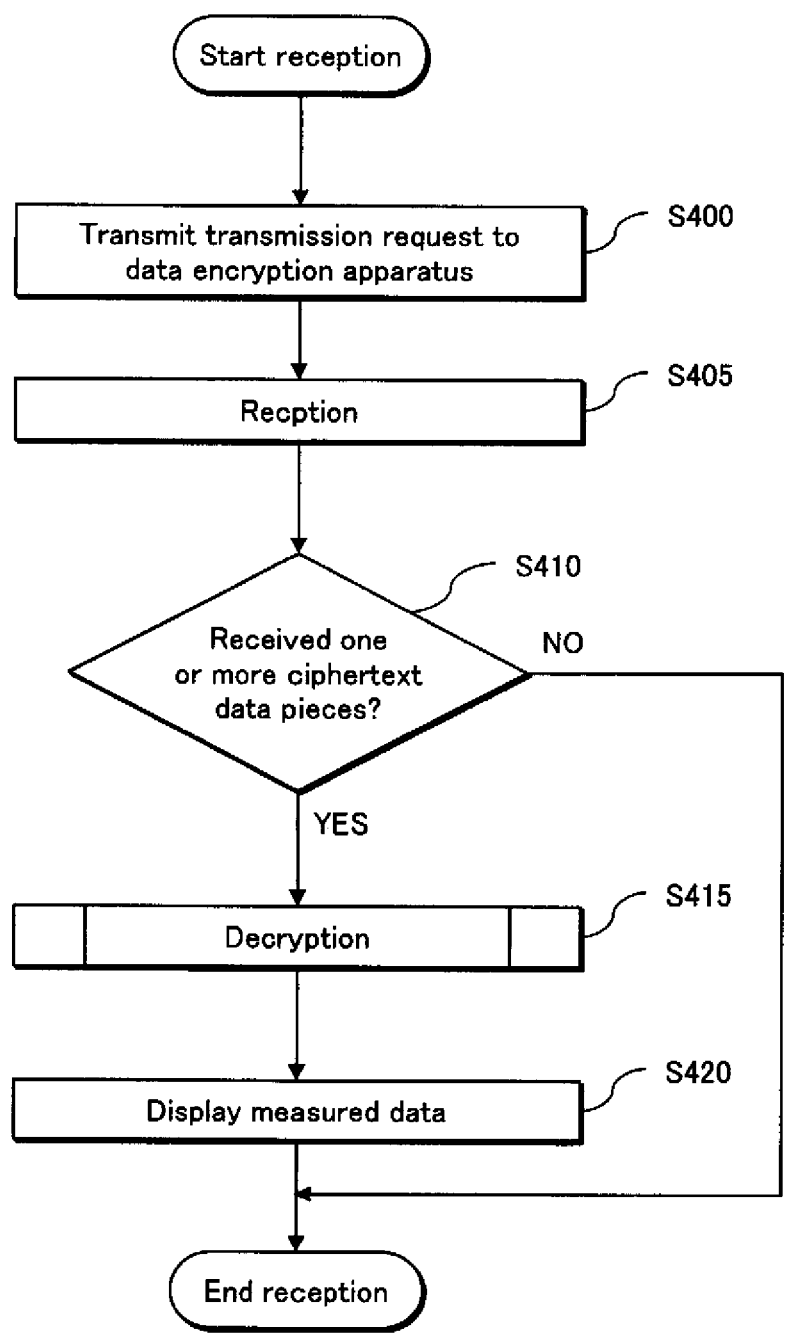
FIG. 13 is a flowchart showing operations for reception performed by the data decryption apparatus 13.

The following explains operations for receiving data, with reference to the flowchart shown in FIG. 13.

When the request receiver 200 receives an instruction from a user to collect the measured data D, the transmitter/receiver 201 transmits the transmission request to the data encryption apparatus 11 via the communication channel 12 (Step S400).

The transmitter/receiver 201 receives one or more ciphertext data pieces (CTDATAs) and the converted-data sizes (USIZEs) that correspond one-to-one to the ciphertext data pieces (CTDATAs), or receives the information indicating that there is no information to be transmitted, from the data encryption apparatus 11 via the communication channel 12 (Step S405).

The transmitter/receiver 201 determines whether it has received one or more ciphertext data pieces (CTDATAs) (Step S410).

If the transmitter/receiver 201 determines that it has received one or more ciphertext data pieces (CTDATAs) ("YES" in Step S410), the transmitter/receiver 201 outputs the one or more ciphertext data pieces (CTDATAs) and the converted-data sizes (USIZEs) that correspond one-to-one to the ciphertext data pieces (CTDATAs), to the decryptor 203.

On receipt of the one or more ciphertext data pieces (CTDATAs) and the converted-data sizes (USIZEs) that correspond one-to-one to the ciphertext data pieces (CTDATAs), the decryptor 203 decrypts each of the received one or more ciphertext data pieces (CTDATAs) (Step S415).

The display 205 displays the decrypted text data pieces (DTDATAs) stored in the decrypted text storage 204 (Step S420).

If the transmitter/receiver 201 determines that it has not received one or more ciphertext data pieces (CTDATAs), that is, it has received information indicating that there is no information to be transmitted ("NO" in Step S410), the transmitter/receiver 201 outputs the received information to the display 205. On receipt from the transmitter/receiver 201 of the information indicating that there is no information to be transmitted, the display 205 shows that the number of ciphertext data pieces received from the data encryption apparatus 11 is 0, and finishes the processing.

<Decryption>

Figure 14:
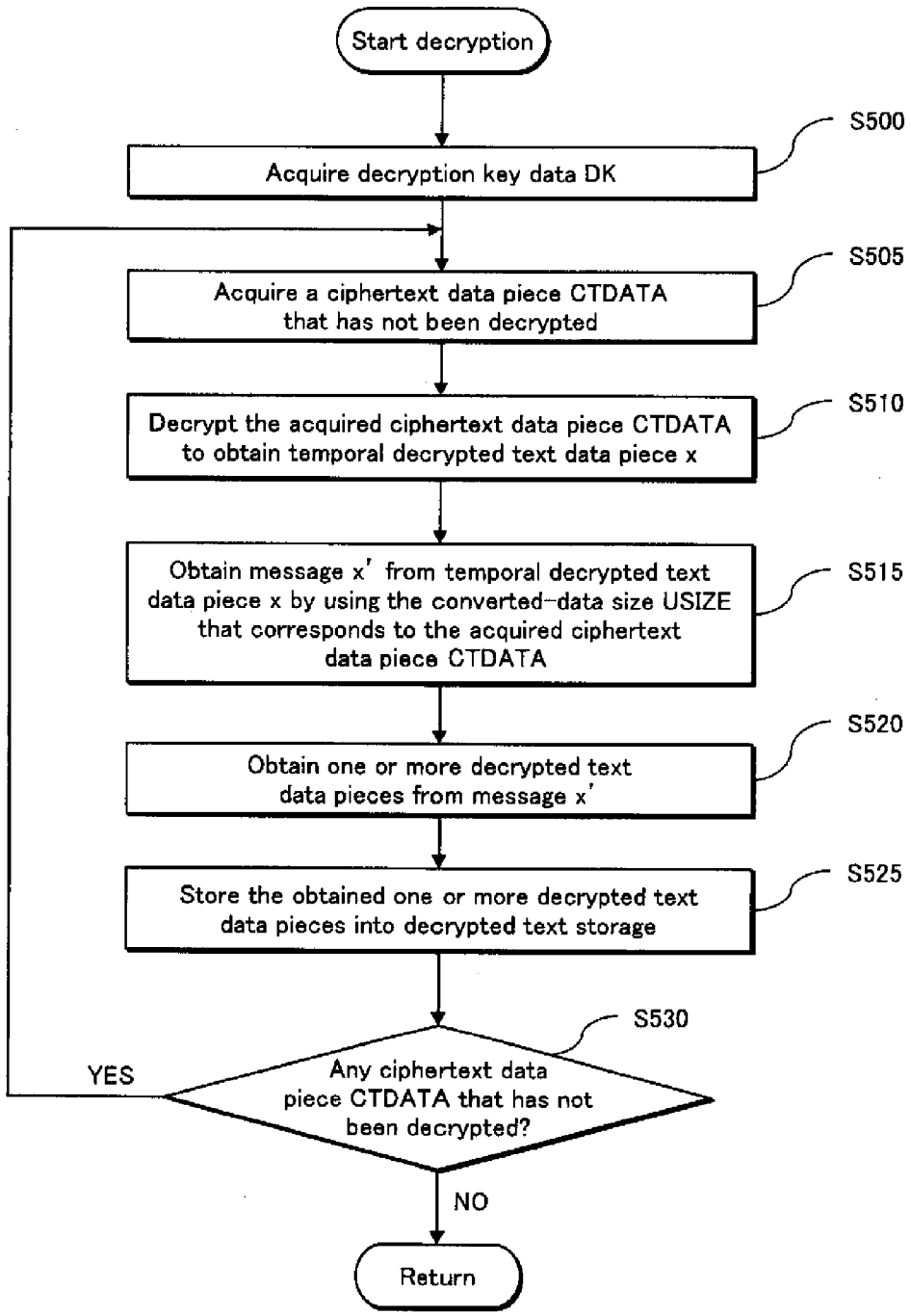
FIG. 14 is a flowchart showing operations for decryption.

This section explains the decryption performed in Step S415, with reference to the flowchart shown in FIG. 14.

The decryptor 203 accesses the decryption key storage 202, and acquires the decryption key data DK (Step S500).

From among the received one or more ciphertext data pieces (CTDATAs), the decryptor 203 acquires one ciphertext data piece CTDATA that has not been decrypted (Step S505).

The decryptor 203 decrypts the acquired ciphertext data piece CTDATA, thereby obtaining a temporal decrypted text data piece x (Step S510).

The decryptor 203 obtains a message x' by using the converted-data size USIZE that corresponds to the acquired ciphertext data piece CTDATA (Step S515).

From the message x', the decryptor 203 obtains one or more decrypted text data pieces consisting of the measured data D and the counter information CTR corresponding thereto (Step S520).

The decryptor 203 stores each of the acquired one or more decrypted text data pieces (DTDATAs) into the decrypted text storage 204 (Step S525).

The decryptor 203 determines whether there is any ciphertext data piece CTDATA that has not been decrypted (Step S530).

If determined that there is such a ciphertext data piece ("YES" in Step S530), the decryptor 203 returns to Step S505, and continues the processing.

If determined that there is no such a ciphertext data piece ("NO" in Step S530), the decryptor 203 finishes the decryption processing.

1.7 Modifications

The embodiment described above is only an example of possible embodiments of the present invention, and the present invention is not limited to it. The present invention may be modified as long as it does not depart from the scopes of the present invention. For example, the following modifications are acceptable.

(1) According to the embodiment above, each ciphertext data piece generated by the ciphertext generator 150 is the value immediately before the operation of addition to (i.e. merger with) the plaintext by the encryption processing according to the NTRU encryption. However, this is not necessary for the present invention.

For example, each ciphertext data piece may be a value encrypted from a plaintext having a predetermined fixed value (e.g. all-zero value) by using the encryption key (i.e. public key h). This is for the following reason. According to the NTRU encryption, ciphertext data is generated by the addition (of the coefficients of the polynomial) of the plaintext data. Thus, the addition of the all-zero values does not affect the result. With such a structure, it is possible to implement the present invention by using an existing NTRU encryption apparatus or the like.

(2) According to the embodiment above, the ciphertext generator 150 obtains the ciphertext data pieces by calculation. However, the present invention is not limited to such a structure.

For example, the apparatus may externally acquire new ciphertext data pieces via the communication channel. Alternatively, the apparatus may acquire those embedded in the apparatus before the shipment of the apparatus. Moreover, the ciphertext data pieces in an encrypted state may be embedded in the apparatus, and the apparatus may externally acquire the decryption key therefore. With such a structure, it is unnecessary for the apparatus to generate the ciphertext data pieces by calculation.

The following explains a data encryption system 1a which externally acquires new ciphertext data pieces via a communication channel, particularly about the differences from the embodiment described above.

Figure 15:
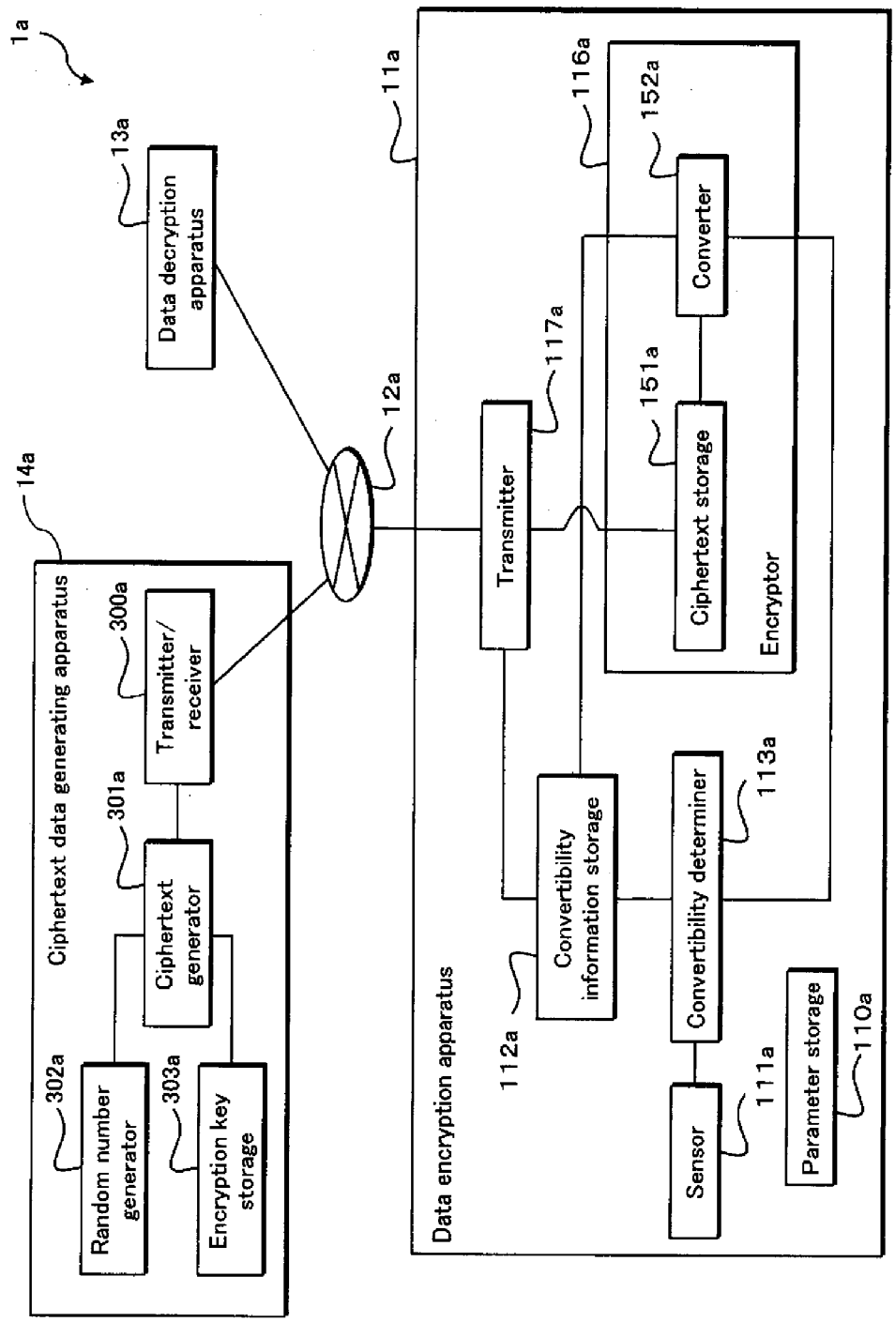

As shown in FIG. 15, the data encryption system 1a includes a data encryption apparatus 11a, a communication channel 12a, a data decryption apparatus 13a, and a ciphertext data generation apparatus 14a.

The data decryption apparatus 13a is similar to the data decryption apparatus 13. Thus its explanation is omitted here.

The data encryption apparatus 11a accumulates therein the measured data pieces that have been encrypted, and transmits the accumulated data pieces to the data decryption apparatus 13a in response to a request from the data decryption apparatus 13a. These operations are similar to the data encryption apparatus 11 according to the embodiment above. Note that once the data encryption apparatus 11a transmits an encrypted data piece, it does not retransmit the same data piece.

The communication channel 12a enables the data encryption apparatus 11a and the data decryption apparatus 13a, and the data encryption apparatus 11a and the ciphertext data generation apparatus 14a, to exchange various data pieces with each other.

(2-1) Structure of Data Encryption Apparatus 11a

This section describes the structure of the data encryption apparatus 11a.

As shown in FIG. 15, the data encryption apparatus 11a includes a parameter storage 110a, a sensor 111a, a convertibility information storage 112a, a convertibility determiner 113a, an encryptor 116a and a transmitter/receiver 117a.

The parameter storage 110a, the sensor 111a and the convertibility information storage 112a are similar to the parameter storage 110, the sensor 111 and the convertibility information storage 112a, respectively. Thus their explanations are omitted here.

Convertibility Determiner 113a

The convertibility determiner 113a receives the target data TD from the sensor 111 and obtains the size information SIZE of the target data TD, which is similar to the convertibility determiner 113 according to the embodiment described above.

The convertibility determiner 113a accesses the convertibility information storage 112a, and checks whether any of the ciphertext identifiers (CTIDs) stored in the convertibility information storage 112a satisfy a certain condition, one by one in the ascending order of the CTIDs. The condition is that the transmission flag UFLAG indicates TRUE and the total size TSIZE decreased by the converted-data size USIZE is greater than the size information SIZE.

If even one such a ciphertext identifier CTID exists in the convertibility information storage 112a, the convertibility determiner 113a outputs the target data TD and the corresponding CTID(s) to a converter 152a.

If no such a ciphertext identifier CTID exists, the convertibility determiner 113a outputs the target data TD and a ciphertext generation request signal REQCT to the converter 152a.

Encryptor 116a

As shown in FIG. 15, the encryptor 116a includes a ciphertext storage 151a and a converter 152a.

The encryptor 116a receives, from the convertibility determiner 113a, a pair of target data TD and a ciphertext generation request signal REQCT, or a pair of target data TD and a ciphertext identifier CTID, and encrypts the received target data TD, which is similar to the encryptor 116 according to the embodiment described above.

The ciphertext storage 151a is similar to the ciphertext storage 151 according to the embodiment described above. Thus its explanation is omitted here.

The following explains the converter 152a.

The converter 152a obtains size information SIZE, which is the data size of the target data TD received from the convertibility determiner 113a.

On receipt of a ciphertext identifier CTID from the convertibility determiner 113a, the converter 152a acquires the ciphertext data piece CTDATA that corresponds to the received ciphertext identifier CTID, and acquires the converted-data size USIZE. Furthermore, the converter 152a performs conversion of the target data using the acquired ciphertext data piece CTDATA and converted-data size USIZE, overwriting thereof, and updating of the converted-data size USIZE.

On receipt of the ciphertext generation request signal REQCT from the convertibility determiner 113a, the converter 152a transmits a request for a new ciphertext data piece CTDATA (=p·r×h (mod q)) to the ciphertext data generation apparatus 14a via the transmitter/receiver 117a.

On receipt of the new ciphertext data piece from the ciphertext data generation apparatus 14a, the converter 152a generates a new ciphertext identifier CTID that has not been used in the ciphertext storage 151a. The converter 152a stores the generated pair of the ciphertext identifier CTID and the ciphertext data piece into the ciphertext storage 151a. Furthermore, the converter 152a stores, in the convertibility information storage 112a, a total size TSIZE indicating 167, a converted-data size USIZE indicating 0, and a transmission flag UFLAG indicating TRUE, in association with the ciphertext identifier CTID generated in advance.

The converter 152a performs conversion of the target data TD, the overwriting thereof, and updating of the converted-data size USIZE, in the similar manner as in the case of receiving the ciphertext identifier CTID from the convertibility determiner 113a.

Transmitter/Receiver 117a

The transmitter/receiver 117a performs the following operations in addition to the operations of the embodiment described above.

On receipt of a request from the converter 152a, the transmitter/receiver 117a transmits the received request to the ciphertext data generation apparatus 14a.

On receipt of a new ciphertext data piece from the ciphertext data generation apparatus 14a, the transmitter/receiver 117a outputs the received new ciphertext data piece to the converter 152a.

(2-2) Structure of Ciphertext Data Generation Apparatus 14a

As shown in FIG. 15, the ciphertext data generation apparatus 14a includes a transmitter/receiver 300a, a ciphertext generator 301a, a random number generator 302a, and an encryption key storage 303a.

The random number generator 302a and the encryption key storage 303a are similar to the random number generator 114 and the encryption key storage 115, respectively. Thus their explanations are omitted here.

Ciphertext Generator 301a

On receipt of a request from the data encryption apparatus 11a, the ciphertext generator 301a generates a new ciphertext data piece CTDATA (=p·r×h (mod q)), in the same manner as the ciphertext generator 150 according to the embodiment described above.

The ciphertext generator 301a transmits the generated new ciphertext data piece CTDATA to the data encryption apparatus 11a.

Transmitter/Receiver 300a

On receipt of a request from the data encryption apparatus 11a, the transmitter/receiver 300a outputs the received request to the ciphertext generator 301a.

On receipt of a new ciphertext data piece from the ciphertext generator 301a, the transmitter/receiver 300a transmits the received new ciphertext data piece to the data encryption apparatus 11a.

(2-3) Operations

The following describes the measurement performed by the data encryption apparatus 11a with reference to the flowchart shown in FIG. 7, particularly about the difference.

The difference is Step S110 shown in FIG. 7. The following explains the difference.

In the data encryption apparatus 11a, if the convertibility determiner 113a determines that there is no convertible data piece ("NO" in Step S105), the converter 152a transmits a request to the ciphertext data generation apparatus 14a. Then, the ciphertext data generation apparatus 14a generates a new ciphertext data piece CTDATA (=p·r×h (mod q)), and transmits it to the data encryption apparatus 11a. On receipt of the new ciphertext data piece CTDATA from the ciphertext data generation apparatus 14a, the converter 152a in the data encryption apparatus 11a generates a new ciphertext identifier CTID, and stores the pair of the new ciphertext identifier CTID and the new ciphertext data piece CTDATA into the ciphertext storage 151a. Furthermore, the data encryption apparatus 11a sets the initial value to the total size TSIZE, the initial value (i.e. TRUE) to the transmission flag UFLAG, and the initial value (i.e. 0) to the converted-data size USIZE, and adds them to the convertibility information storage 112a in association with the ciphertext identifier CTID generated in advance.

After that, Step S115 and the following Steps are performed. Note that the operations for the conversion can be realized through the same operations as the operations shown in FIG. 8. Thus, their explanations are omitted here.

Also, the operations for the transmission performed by the data encryption apparatus 11a can be realized through the same operations as the operations shown in FIG. 10. Thus, their explanations are omitted here.

Also, the operations for the reception and the decryption performed by the data decryption apparatus 13a can be realized through the same operations as the operations shown in FIG. 13 and FIG. 14. Thus, their explanations are omitted here.

(2-4) Others

According to the embodiment above, the same communication channel 12a is used for the transmission of various data pieces between the data encryption apparatus 11a and the data decryption apparatus 13a and between the data encryption apparatus 11a and the ciphertext data generation apparatus 14a. However, this is not essential.

The data transmission may be performed via different communication channels. For example, the data encryption apparatus 11a may be attachable to the ciphertext data generation apparatus 14a, so that a communication channel is established when the data encryption apparatus 11a is attached to the ciphertext data generation apparatus 14a. That is, any structure is applicable as long as it establishes a communication channel between the data encryption apparatus 11a and the ciphertext data generation apparatus 14a and the devices are connected via the communication channel. The same applies to the communication channel between the data encryption apparatus 11a and the data decryption apparatus 13a.

(3) According to the embodiment above, the convertibility information storage 112 holds the converted-data size USIZE. However, this is not essential. For example, the convertibility information storage 112 may holds a convertible-data size instead of the converted-data size USIZE. The convertible-data size is obtained by subtracting the converted-data size USIZE from the total size TSIZE. With the convertible-data size, it is unnecessary to perform the subtraction at the convertibility determination.

(4) According to the embodiment above, the NTRU encryption is used. However, this is not essential. Any kinds of public key cryptography is applicable as long as it uses random numbers to encrypt data and obtains a ciphertext by merging values generated with the random numbers with plaintext data by performing a certain calculation (e.g. arithmetic addition, arithmetic subtraction, exclusive OR, arithmetic multiplication, addition between polynomials, subtraction between polynomials, etc.). For example, ElGamal encryption and elliptic curve ElGamal encryption are applicable.

Also, the present invention may be used with secret key cryptography.

The following explains the case where elliptic curve ElGamal encryption as public key cryptography is used. In the following, generation of parameters, generation of keys, a method for generating ciphertext data, a conversion method and decryption are separately explained.

<Generation of Parameters>

An elliptic curve is defined by $y^2=x^3+a \times x+b$. Here, "$z^j$" denotes z raised to the $j^{th}$ power, and "$a \times x$" denotes multiplication of a and x. a and b are natural numbers, which determine the elliptic curve. The filed of definition, which defines the elliptic curve is $GF(p^m)$ in general. Here, p is a prime number and m is a natural number. In the following, suppose the case where m=1 for simplification. Thus, the filed of definition is $GF(p)$. Also, suppose that p is 160 bits.

<Generation of Keys>

The private key is ks, and the public key KP satisfy KP=ks*G. Here, G denotes the base point for the elliptic curve ElGamal encryption, which is a point on the elliptic curve. ks*G denotes a point on the elliptic curve, which is obtained by adding the base point G ks times.

<Generation of Ciphertext Data>

The data encryption apparatus generates a random number r, and calculates PC=r*G. Next, the data encryption apparatus calculates c=r*KP, and concatenates c with the x-coordinate of PC (i.e. x(PC)) to obtain the ciphertext data. The total size TSIZE is determined to be 160, and the converted-data size USIZE is determined to be 0.

<Conversion Method (m)>

The following describes the case of converting n-bit data z.

First, the data encryption apparatus obtains a value (i.e. subtraction value) by subtracting the converted-data size USIZE from the total size TSIZE of the ciphertext data in which at least one piece of the stored target data is encrypted.

The data encryption apparatus judges whether the obtained value is less than n bits or not. If judged that the obtained value is less than n bits, the data encryption apparatus generates ciphertext data according to the above-described method for the generation of the ciphertext data, and performs the following processing. If judged that the obtained value is no less than n bits, the data encryption apparatus performs the following processing with the ciphertext data used for the calculation of the subtraction value. In the case where it is unnecessary to distinguish the newly generated ciphertext data and the ciphertext data used for obtaining the subtraction value, the data is collectively called "ciphertext data c" in the following explanation.

The data encryption apparatus performs an exclusive OR operation on each of the bits from the $(USIZE+1)^{th}$ bit to the $(USIZE+n)^{th}$ bit of the ciphertext data c and each of the bits from the $1^{st}$ bit to the $n^{th}$ bit of the data z. Here, an exclusive OR operation is performed on the $(USIZE+1)^{th}$ bit of the ciphertext data c and the $1^{st}$ bit of the data z, and the $(USIZE+1)^{th}$ bit of the ciphertext data c is overwritten with the result of the operation. Then, an exclusive OR operation is performed on the $(USIZE+2)^{th}$ bit of the ciphertext data c and the $2^{nd}$ bit of the data z, and the $(USIZE+2)^{th}$ bit of the ciphertext data c is overwritten with the result of the operation. Such operations are repeated to the $(USIZE+n)^{th}$ bit of the ciphertext data c, and thus an exclusive OR operation is performed on every bit of the data z.

After performing an exclusive OR operation on every bit of the data z, the data encryption apparatus updates the converted-data size USIZE by adding n thereto.

Here, one example method for performing an exclusive OR operation on every bit of the data z is described next.

The data encryption apparatus performs a shift operation on the bit sequence of the data z such that the first bit of the bit sequence corresponds to the $(USIZE+1)^{th}$ bit of the ciphertext data c.

Then, the data encryption apparatus performs an exclusive OR operation within the range from the $(USIZE+1)^{th}$ bit to the $(USIZE+n)^{th}$ bit of each of the data z, which has been subject to the shift operation, and the encryption data c. Thus, the data encryption apparatus can perform an exclusive OR operation on every bit of the data z.

<Decryption>

For x(PC) contained in the ciphertext data, the square root rt of $z=x(PC)^3+a \times x+b$ on GF(p) is calculated, and PC'=(x(PC), rt) is determined. The following explains how to calculate the square root on GF (p) in the case where p=3 mod 4. Other methods for calculating the square root are well known. Here, "d mod e" denotes a remainder of d divided by e. The square root of z is obtained by $z^{((p+1)/4)}$. Generally, $z^{(p-1)}=1$ mod p is true, and thus $z^{(p+1)}=z^2$ mod p is true. Therefore, the square root of z is $z^{((p+1)/4)}=(z^2)^{(1/4)}=z^{(1/2)}$. Next, ks*PC' is calculated by using the secret key ks. Finally, c xor x(ks*PC') is calculated by using ks*PC'. The result is the ciphertext data. Note that x(P) denotes the x coordinate of P, and xor denotes an exclusive OR operation.

Figure 16:
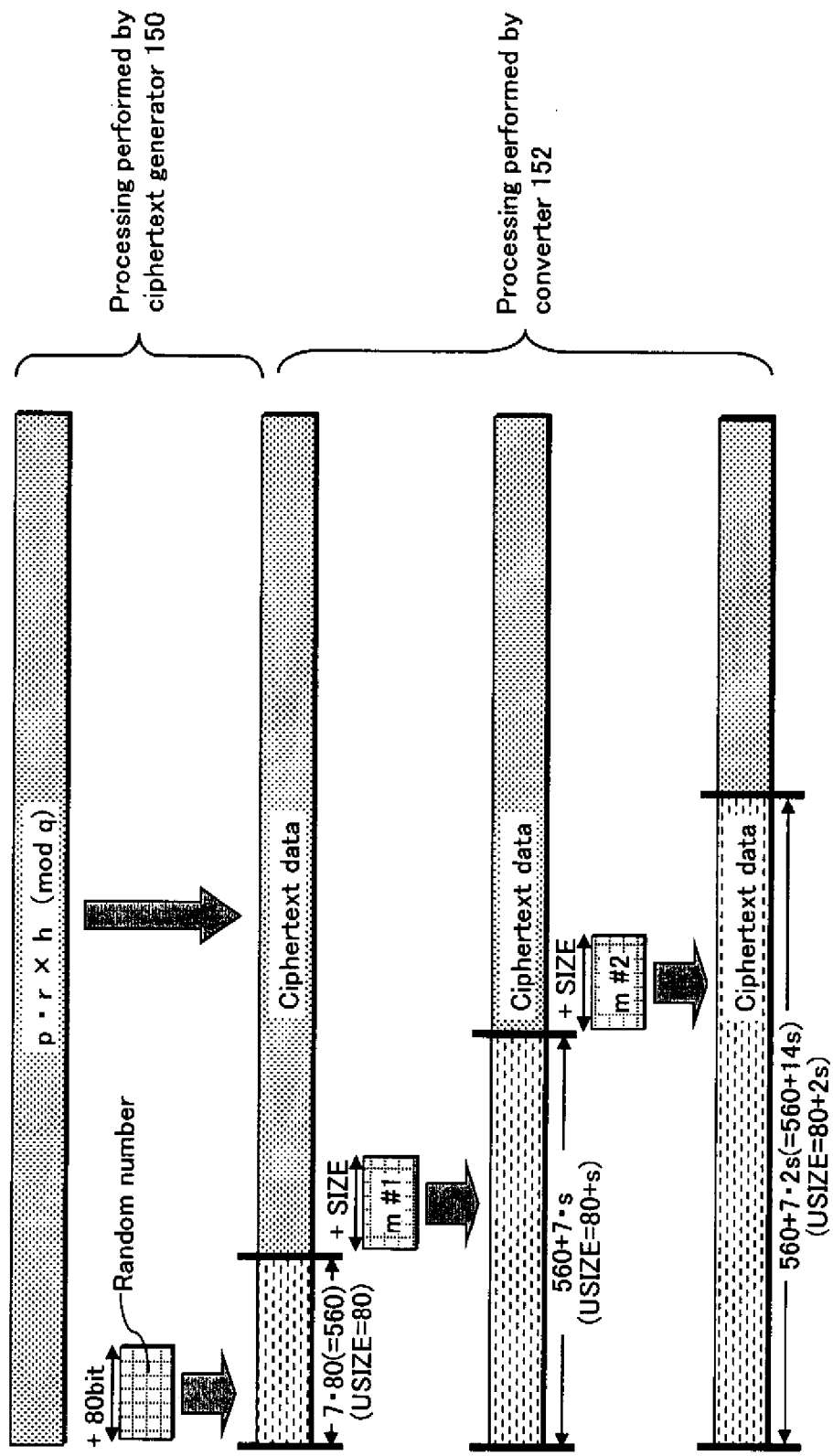
FIG. 16 shows a specific example of processing performed by the ciphertext generator 150 and the converter 152 in the case where a random number is converted in the ciphertext data CTDATA (=p·r×h) in advance.

(5) In the ciphertext to be generated by the ciphertext generator 150, a random number may be converted in advance as shown in FIG. 16, for protection against known-plaintext attacks. The number of the bits of the random number is 80 for example, which can prevent unauthorized third parties from trying all the combinations. This structure may be adopted because unauthorized third parties might be able to analyze the ciphertext if only less than a predetermined number of bits have been converted. The method for such an analysis is as follows:

(5-1) For the public key h, calculate inv_h that satisfies h×inv_h=1 (mod q).

(5-2) Assume that the plaintext data candidate value including the converted part is m'. Also assume that the value of the converted part is an expected value, and the value of the remaining part is 0.

(5-3) For the ciphertext data piece CTDATA, calculate a first intermediate value CV1=CTDATA−m', as a polynomial.

(5-4) For the first intermediate value CV1, calculate a second intermediate value CV2=p·CV1×inv_h, as a polynomial.

(5-5) For the second intermediate value CV2 as a polynomial, check whether all the coefficients satisfy the condition at the generation of the random number r (i.e. Among the N pieces of coefficients, d pieces of the coefficients are 1, d pieces of the coefficients are −1, and N−2d pieces of coefficients are 0). If the condition is satisfied, output the plaintext data candidate value m' assumed in the step (5-2), as the correct plaintext data m. If the condition is not satisfied, replace the plaintext data candidate value m' with another value, and repeat the steps (5-3) to (5-5).

Here, the reason why no less than a predetermined number of bits are converted is that the increased number of patterns in the step (5-2) prevents the analyzer from trying all the combinations. This conversion makes it unnecessary for the transmitter 117 to check the converted-data size USIZE. The initial value of the converted-data size USIZE in the convertibility information storage 112 is the number of the bits of the converted random number.

As mentioned above, if a plaintext having a smaller size than a predetermined size (e.g. 80 bits) is encrypted into a ciphertext at the first time, it can be analyzed through known-plaintext attacks and accordingly the plaintext can be obtained by a third party without authorization. In view of this, a predetermined size is added in advance, and hence the plaintext will be protected against known-plaintext attacks.

In this example, an 80-bit random number is converted to prevent know-plaintext attacks. However, an 80-bit all-zero value may be converted.

(6) The convertibility information storage 112 may be configured from a secure memory so that external accesses are prevented. With this structure, the converted-data size USIZE does not leak to third parties. Thus, the apparatus is capable of preventing attacks from third parties conjecturing the plaintext. This improves the security of the apparatus.

(7) The encryption key EK (i.e. public key h) stored in the encryption key storage 115 of the data encryption apparatus 11 may be externally determined. With this structure, the key can be determined after the shipping, which improves the convenience.

For example, before generating a ciphertext data at the first time, the data encryption apparatus may acquires the encryption key EK (i.e. the public key h) from an external device that holds the public key, and store therein the public key h. After storing the public key h, the data encryption apparatus operates in the same manner as the embodiment explained above. Thus, the explanation is omitted here.

Also, the data encryption apparatus may acquire the encryption key EK (i.e. the public key h) from an external apparatus that holds the public key every time it generates a ciphertext data CTDATA (=p·r×h (mod q)). If this is the case, the data encryption apparatus is configured from the components shown in FIG. 2 except the encryption key storage. The ciphertext generator receives a ciphertext generation request signal REQCT from the convertibility determiner, and then transmits a request for the public key h to the external apparatus that holds the key. On receipt of the public key h from the external apparatus, the data encryption apparatus generates a ciphertext data CTDATA (=p·r×h (mod q)) in the same manner as the embodiment explained above.

(8) In the description above, the transmitter 117 performs the same operations every time, in response to an external request. However, this is not necessary. For example, in the case of receiving a special command from the outside, the transmitter 117 may transmit the ciphertext data CTDATA without exception, instead of checking the converted-data size USIZE. Also, the transmitter 117 may change its operation depending on the authorization method adopted.

(9) In the description above, the ciphertext generator 150 generates a ciphertext data by calculations. However, this is not necessary. For example, the data encryption apparatus 11 may store in advance two or more ciphertext data pieces (which are in the initial status before the conversion) generated by the ciphertext generator 150 in the ciphertext storage 151.

If this is the case, the converter 152 of the data encryption apparatus 11 performs the data conversion (i.e. encryption) by using the same single ciphertext data piece until it becomes impossible to perform the conversion with it. Then, after the convertibility determiner 113 judges that it is impossible to perform the conversion (i.e. encryption) with the ciphertext data piece, the converter 152 performs the data conversion with another ciphertext data piece stored in the ciphertext storage 151.

Alternatively, the ciphertext generator 150 of the data encryption apparatus 11 may select one of the two or more ciphertext data pieces. For the selection, the ciphertext generator 150 may use a random number. With such a structure, the data encryption apparatus 11 can efficiently convert the target data with a small number of ciphertext data pieces. Here, note that this structure makes plural copies of the same ciphertext data piece, and they are converted with different target data pieces. This means that there is a risk that a portion of information leaks from the ciphertext data pieces that have been output. Specifically, if a third party knows that the ciphertext data pieces are derived from the same initial ciphertext data piece, he/she can specify the difference between the target data pieces used for the conversion by calculating the difference between the ciphertext data pieces (i.e. by arithmetic subtraction). However, by enabling the ciphertext generator 150 to randomly select a ciphertext data piece, it is possible to reduce the risk that a third party recognizes that the ciphertext data pieces are derived from the same initial ciphertext data piece.

(10) In the description above, the data decryption apparatus stores in advance the size (e.g. 5 bytes) of the data composed of the measured data D and the counter information CRT. However, this is not necessary.

For example, the data encryption apparatus 11 may store all the pieces of size information (SIZEs) used for the conversion of the target data, and output the pieces of size information together with a ciphertext data piece when outputting the ciphertext data piece to the data decryption apparatus 13. With this structure, even when the target data has a variable length, the data decryption apparatus 13 divides the message x' by using the size information SIZE. Thus, each piece of the original target data, namely each data piece composed of the measure data D and the counter information CRT can be decrypted separately. This improves the usability after the decryption.

(11) When outputting the ciphertext data pieces to the data decryption apparatus 13, the data encryption apparatus 11 may output their corresponding ciphertext identifiers (CTIDs) together with the ciphertext data pieces. For example, the ciphertext identifiers may show the order of generation by the data encryption apparatus 11. With such a structure, the data decryption apparatus 13 is capable of knowing the order of measurement (i.e. generation) of the sensor information contained in the decrypted text data pieces, by using the ciphertext identifiers (CTIDs), after acquiring the decrypted text data pieces by decrypting the ciphertext data pieces.

(12) The target data used for the conversion by the data encryption apparatus 11 is not limited to the measured sensor information. For example, it may be a hash value or a coded value of a certain value (e.g. the sensor information), or key data. Also, a mixture of different types of values (e.g. measured data, a hash value and a key) may be used for the conversion of the single ciphertext data piece.

(13) According to the embodiment described above, the converted-data size USIZE is assumed as a border value between the used area and the unused area (i.e. s times lager than the size of the target data). However, this is not necessary.

The converted-data size USIZE may be a multiple of a value greater than the size s of the target data. For example, it may a multiple of (s+w), where s denotes the size of the target data and w denotes a predetermined value.

(14) According to the embodiment described above, the target data is encrypted by sequentially using the ciphertext data pieces from the first piece. However, this is not necessary.

In the ciphertext data, areas that have not been used for the encryption may be randomly used.

For example, in the encryption for the first time, a portion having the size s of the target data piece is used from the beginning of the ciphertext data. In the next encryption (i.e. encryption for the second time), a portion having the size of the target data piece is used from the $4s^{th}$ ciphertext data piece. In the encryption for the third time, a portion having the size of the target data piece is used from the $2s^{th}$ ciphertext data piece. With such operations, areas that have not been used for the encryption in the ciphertext data can be randomly used.

(15) The devices of the above embodiment may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions.

(16) Part or all of the constituent elements of the devices of the above embodiment may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

For example, each of the functional blocks constituting the data encryption apparatus, namely the convertibility information storage 112, the convertibility determiner 113, the random number generator 114, the encryption key storage 115, the ciphertext generator 150, the ciphertext storage 151 and the converter 152 for example, may be realized as an LSI. These blocks may be realized as individual chips or as a single chip including part or all of them.

Each of the functional blocks constituting the data decryption apparatus, namely the decryption key storage 202, the decryptor 203 and the decrypted text storage 204 for example, may be realized as an LSI. These blocks may be realized as individual chips or as a single chip including part or all of them.

Note that though system LSI is used here, the circuit may be variously described as IC, LSI, super LSI or ultra LSI depending on the level of integration.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, or the like is considered to be a possibility.

(17) Part or all of the constituent elements of the devices of the above embodiment may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper resistant.

(18) The present invention may be the methods shown above. Also, the present invention may be computer programs for causing computers to realize the methods, or may be digital signals representing the computer programs.

(19) Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

(20) Also, the present invention may be the computer programs or digital signals which are transmitted via an electronic communications circuit, a wireless or fixed-line communications circuit, a network such as the Internet, a data broadcast, etc.

(21) Also, the present invention may be a computer system including a microprocessor and a memory, whereby the memory stores the computer programs, and the microprocessor operates in accordance with the computer programs.

(22) Also, the present invention may be carried out by another independent computer system by transferring the programs or the digital signals which have been recorded on the recording media, or by transferring the programs or the digital signals via the network, etc.

(23) The present invention may be any combination of the above embodiment and modifications.

1.8 Others (1) One aspect of the present invention is a data encryption apparatus comprising: a target data acquiring unit operable to acquire target data in a plurality of times; a ciphertext storage operable to store one or more pieces of ciphertext data; an unconverted part information storage operable to store unconverted part information, which shows an unconverted part in each of the one ore more pieces of ciphertext data; and a converter operable to convert one of the one or more pieces of ciphertext data based at least on the unconverted part information and the target data.

(2) The data encryption apparatus described in (1) above may further comprise: a convertibility determiner operable to determine whether any of the one or more pieces of ciphertext data is convertible or not based at least on a size of the target data and the unconverted part information; and a ciphertext data acquiring unit operable to acquire new ciphertext data when the convertibility determiner determines that all the one or more pieces of ciphertext data is not convertible.

(3) The data encryption apparatus described in (2) above may further comprise: a public key storage operable to store a public key for public key cryptography; and a random number generating unit operable to generate random number data, wherein the ciphertext data acquiring unit may generate ciphertext data based at least on the public key and the random number data.

(4) In the data encryption apparatus described in (3) above, the ciphertext data acquiring unit may generate the ciphertext data by performing calculations for encryption according to the public key cryptography until just before merging with the target data, the merging included in the calculations for encryption.

(5) In the data encryption apparatus described in (3) above, the ciphertext data acquiring unit may have a plaintext initial value given in advance, and generate the ciphertext data by encrypting the plaintext initial value according to the public key cryptography by using the public key and the random number data.

(6) In the data encryption apparatus described in (5) above, the plaintext initial value may be 0.

(7) The data encryption apparatus described in (2) above may further comprise: a receiving unit operable to receive external data, wherein the ciphertext data acquiring unit may acquire the ciphertext data via the receiving unit.

(8) The data encryption apparatus described in (1) above may further comprise: an output unit operable to output the ciphertext data stored in the ciphertext data storage.

(9) In the data encryption apparatus described in (8) above, the unconverted part information may include, for each of the one or more pieces of ciphertext data pieces, a convertibility flag which shows whether f the corresponding ciphertext data piece is still convertible, and the output unit sets the convertibility flag to indicate "inconvertible" when outputting the corresponding ciphertext data piece.

(10) In the data encryption apparatus described in (8) above, the unconverted part information may include, for each of the one or more piece of ciphertext data pieces, at least one selected from a converted-data size which shows a size of data already converted in the corresponding ciphertext data piece and a convertible-data size which shows a size of convertible data remaining, and the output unit may output the converted-data size or the convertible-data size when outputting the corresponding ciphertext data piece.

(11) In the data encryption apparatus described in (10) above, the output unit may output each of the one or more ciphertext data pieces only when the corresponding converted-data size is no less than a predetermined value or when the corresponding convertible-data size is no greater than a predetermined value.

(12) In the data encryption apparatus described in (3) above, the ciphertext data acquiring unit may generate the ciphertext data based on all or part of encryption according to the public key cryptography, which is one selected from NTRU encryption, ElGamal encryption and elliptic curve ElGamal encryption, and the converter may use at least one of arithmetic addition, arithmetic subtraction, arithmetic multiplication and exclusive OR.

(13) In the data encryption apparatus described in (3) above, the ciphertext data acquiring unit may convert the one or more pieces of ciphertext data based on second random number data, which is generated by the random number generator and is irrelevant to the target data, after generating the ciphertext data.

(14) In the data encryption apparatus described in (1) above, the unconverted part information storage may be a secure memory that does not allow external accesses thereto.

(15) In the data encryption apparatus described in (1) above, the target data acquiring unit may have a function to obtain a counter value and a function to obtain sensor information, and the target data may be a value of the sensor information and the counter value.

(16) In the data encryption apparatus described in (15) above, the sensor information may be at least one selected from a body temperature, a blood pressure, a blood sugar level, a number of pulses, a heart rate, an amount of exercise and a number of steps, and be measured regularly according to a timer.

(17) The data encryption apparatus described in (15) above may further comprise a public key setting unit operable to externally setting the public key.

(18) Another aspect of the present invention is a data decryption apparatus comprising: an acquiring unit operable to externally acquire ciphertext data and size information; a decryption key storage operable to store a decryption key; a decrypted text data storage operable to store decrypted text data; a decryption unit operable to obtain the decrypted text data by decrypting the ciphertext data by using the decryption key; and a deleting unit operable to delete part of the decrypted text data based on the size information and stores the deleted part of the decrypted text data into the decrypted text data storage.

(19) In the data decryption apparatus described in (18) above, the decryption key may be based on public key cryptography, and the decryption unit may performs the decryption according to the public key cryptography.

(20) In the data decryption apparatus described in (19) above, the decryption unit performs the decryption according to the public key cryptography which is one selected from NTRU encryption, ElGamal encryption and elliptic curve ElGamal encryption.

(21) Another aspect of the present invention is a data encryption system including a data encryption apparatus and a data decryption apparatus, the data encryption apparatus comprising: a target data acquiring unit operable to acquire target data in a plurality of times; a ciphertext storage operable to store one or more pieces of ciphertext data; an unconverted part information storage operable to store unconverted part information, which shows an unconverted part in each of the one ore more pieces of ciphertext data; a convertibility determiner operable to determine whether the one of the one or more pieces of ciphertext data is convertible or not based at least on a size of the target data and the unconverted part information; a ciphertext data acquiring unit operable to acquire new ciphertext data when the convertibility determiner determines that the one of the one or more pieces of ciphertext data is not convertible; and a converter operable to convert one of the one or more pieces of ciphertext data based at least on the unconverted part information and the target data, and the data decryption apparatus comprising: an acquiring unit operable to externally acquire ciphertext data and size information; a decryption key storage operable to store a decryption key; a decrypted text data storage operable to store decrypted text data; a decryption unit operable to obtain the decrypted text data by decrypting the ciphertext data by using the decryption key; and a deleting unit operable to delete part of the decrypted text data based on the size information and stores the deleted part of the decrypted text data into the decrypted text data storage.

(22) In the data encryption system described in (21) above, the data encryption apparatus may further comprise a public key storage operable to store a public key for public key cryptography; and a random number generating unit operable to generate random number data, wherein the ciphertext data acquiring unit may generate ciphertext data based at least on the public key and the random number data.

(23) In the data decryption system described in (22) above, the ciphertext data acquiring unit may generate the ciphertext data based on all or part of encryption according to the public key cryptography, which is one selected from NTRU encryption, ElGamal encryption and elliptic curve ElGamal encryption, the converter may use at least one of arithmetic addition, arithmetic subtraction, arithmetic multiplication and exclusive OR, and the decryption unit performs the decryption according to the same public key cryptography as the ciphertext data acquiring unit.

In the case where small pieces of encrypting and accumulating small pieces of data, a data encryption system pertaining to the present invention is capable of preventing target data from leaking even if the accumulated data pieces are analyzed, while preventing the size of the encrypted data pieces from increasing. Thus, the data encryption system is useful when it is required to encrypt and accumulate data pieces under severe restrictions on such as the battery capacity, the memory, and the communication speed.

Also, a data encryption apparatus and a data decryption apparatus pertaining to the present invention can be used managerially, continuously, and repeatedly in the industries that manufacture and sell them.

REFERENCE SIGNS LIST

1 Data encryption system
11 Data encryption apparatus
12 Communication channel
13 Data decryption apparatus
110 Parameter storage
111 Sensor
112 Convertibility information storage
113 Convertibility determiner
114 Random number generator
115 Encryption key storage
116 Encryptor
117 Transmitter
150 Ciphertext generator
151 Ciphertext storage
152 Converter
200 Request receiver
201 Transmitter/receiver
202 Decryption key storage
203 Decryptor
204 Decrypted text storage
205 Display

The invention claimed is:

1. An encryption apparatus for encrypting a data piece that is smaller than a unit length for encryption, comprising:
a storage unit operable to store therein management information indicating a used area within an encryption area defined based on the unit length, the used area being an area already used for encryption;
an encryption unit operable, when encrypting a new data piece that is smaller than the unit length, to generate encrypted data by adding the new data piece to an unused area within the encryption area with reference to the management information, the unused area being an area within the encryption area that has not yet been used for encryption; and
a control unit operable to update the management information to include an area for encryption of the new data piece into the used area, after the encryption unit generates the encrypted data.

2. The encryption apparatus of claim 1, wherein
the encryption unit adds the new data piece to the unused area only when the area for encryption of the new data piece is contained within the unused area.

3. The encryption apparatus of claim 2, wherein
when the area for encryption of the new data piece is larger than the unused area, the encryption unit generates, in a new encryption area, second encrypted data beginning with the new data piece, and
after the encryption unit generates the second encrypted data, the control unit generates, based on the second encrypted data, second management information indicating the area for encryption of the new data piece as a used area within the new encryption area, and stores the second management information in the storage unit.

4. The encryption apparatus of claim 3, wherein
each of the first management information and the second management information further includes a data length of the corresponding used area.

5. The encryption apparatus of claim 4, wherein
the unit length is represented as a data length of plaintext data available for encryption,
a data length of the used area is a data length of part of the plaintext data used for encryption, and
the encryption unit determines that the area for encryption of the new data piece is contained within the unused area when a value obtained by subtracting the data length of the used area from the unit length is greater than a data length of the new data piece.

6. The encryption apparatus of claim 5, wherein
the encryption unit determines that the area for encryption of the new data piece is larger than the unused area when the value obtained by subtracting the data length of the used area from the unit length is less than the data length of the new data piece.

7. The encryption apparatus of claim 1, wherein
the encryption unit includes a holding unit holding a public key for public key cryptography, and
a generator generating a random number, generates a one-time encryption key based on the unit length by using the public key and the random number, and adds the new data piece by using, as the encryption area, a data area containing the one-time encryption key.

8. The encryption apparatus of claim 7, wherein
the encryption unit causes the generator to generate a different random number for each data piece having the unit length, and generates a different one-time encryption key for each data piece having the unit length.

9. The encryption apparatus of claim 1, wherein
when the encryption unit encrypts the new data piece for the first time by using an encryption area defined based on the unit length and a data size of the used area is smaller than a predetermined minimum size, the encryption unit generates the encrypted data by adding an initial data thereto so that the data size of the used area exceeds the predetermined minimum size.

10. The encryption apparatus of claim 9, wherein
the initial data is a sequence of numbers generated from random numbers.

11. The encryption apparatus of claim 1 further comprising:
a connector operable to connect to an external apparatus, wherein
the external apparatus includes:
a holding unit holding a public key for public key cryptography;
a random number generator generating a random number; and
a key generator generating a one-time encryption key by using the public key and the random number, and
the encryption unit receives the one-time encryption key from the external apparatus, and generates the encrypted data by using, as the encryption area, a data area containing the one-time encryption key.

12. The encryption apparatus of claim 1 further comprising:
a second storage unit, wherein
the encryption unit includes a holding unit holding a public key for public key cryptography, and
a generator generating a random number, generates a one-time encryption key based on the unit length by using the public key and the random number, stores the one-time encryption key into the second storage unit, and reads, from the second storage unit, a different one-time encryption key for each data piece having the unit length, and adds the new data piece by using, as the encryption area, a data area containing the one-time encryption key.

13. The encryption apparatus of claim 1 further comprising:
a connector operable to connect to an external apparatus holding a public key for public key cryptography, wherein
the encryption unit includes a random number generator that generates a random number, generates a one-time encryption key based on the unit length by using the public key input from the external apparatus and the random number, and adds the new data piece by using, as the encryption area, a data area containing the one-time encryption key.

14. The encryption apparatus of claim 1 further comprising:
a connector operable to connect to an external apparatus for decrypting the encrypted data, wherein
when the new data piece is to be the first data piece of the encrypted data and a data size of the used area is smaller than a predetermined minimum size, the control unit performs control for not outputting the encrypted data to the external apparatus until the data size of the used area reaches the predetermined minimum size.

15. The encryption apparatus of claim 14, wherein
when the data size of the used area reaches the predetermined minimum and the encrypted data is output to the external apparatus, the encryption unit generates second encrypted data beginning with a next data piece to the new data piece.

16. The encryption apparatus of claim 1 further comprising:
a connector operable to connect to an external apparatus for decrypting the encrypted data, wherein
the control unit outputs the encrypted data together with the management information to the external apparatus.

17. The encryption apparatus of claim 1, wherein
the encryption unit performs the encryption according to one kind of cryptography selected from the group consisting of NTRU encryption, ElGamal encryption and elliptic curve ElGamal encryption.

18. The encryption apparatus of claim 1, wherein
the storage unit is protected by an anti-tamper technology.

19. An encryption system including an encryption apparatus for encrypting a data piece that is smaller than a unit length for encryption and a decryption apparatus for decrypting the encrypted data piece,
the encryption apparatus comprising:
a storage unit operable to store therein management information indicating a used area within an encryption area defined based on the unit length, the used area being an area already used for encryption;
an encryption unit operable, when encrypting a new data piece that is smaller than the unit length, to generate encrypted data by adding the new data piece to an unused area within the encryption area with reference to the management information, the unused area being an area within the encryption area that has not yet been used for encryption; and
a control unit operable to update the management information to include an area for the new data piece into the used area after the encryption unit generates the encrypted data, and output the encrypted data together with the updated management information to the decryption apparatus, and
the decryption apparatus comprising:
a decryption unit operable to decrypt the encrypted data input from the encryption apparatus, and extracts, from the decrypted data, a data piece existing within an area based on the used area indicated by the management information.

20. An encryption method for encrypting a data piece that is smaller than a unit length for encryption, comprising the steps of:
storing, using a storage unit, management information indicating a used area within an encryption area defined based on the unit length, the used area being an area already used for encryption;
when encrypting, using an encryption unit a new data piece that is smaller than the unit length, generating encrypted data by adding the new data piece to an unused area within the encryption area with reference to the management information, the unused area being an area within the encryption area that has not yet been used for encryption; and
updating, using a control unit, the management information to include an area for the new data piece into the used area, after the generation of the encrypted data.

21. A non-transitory computer-readable recording medium storing a computer program for controlling an encryption apparatus for encrypting a data piece that is smaller than a unit length for encryption, the computer program causing a computer in the encryption apparatus to execute the steps comprising:

storing management information indicating a used area within an encryption area defined based on the unit length, the used area being an area already used for encryption;

when encrypting a new data piece that is smaller than the unit length, generating encrypted data by adding the new data piece to an unused area within the encryption area with reference to the management information, the unused area being an area within the encryption area that has not yet been used for encryption; and updating the management information to include an area for the new data piece into the used area, after the generation of the encrypted data.

22. An integrated circuit for use in an encryption apparatus for encrypting a data piece that is smaller than a unit length for encryption, comprising:

a storage unit operable to store therein management information indicating a used area within an encryption area defined based on the unit length, the used area being an area already used for encryption;

an encryption unit operable, when encrypting a new data piece that is smaller than the unit length, to generate encrypted data by adding the new data piece to an unused area within the encryption area with reference to the management information, the unused area being an area within the encryption area that has not yet been used for encryption; and a control unit operable to update the management information to include an area for the new data piece into the used area, after the generation of the encrypted data.

* * * * *